(12) United States Patent
Kim

(10) Patent No.: US 11,501,069 B2
(45) Date of Patent: Nov. 15, 2022

(54) ELECTRONIC DEVICE FOR INPUTTING CHARACTERS AND METHOD OF OPERATION OF SAME

(71) Applicant: Samsung Electronics Co., Ltd., Gyeonggi-do (KR)

(72) Inventor: Chulwoo Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/048,321

(22) PCT Filed: Apr. 10, 2019

(86) PCT No.: PCT/KR2019/004280
§ 371 (c)(1),
(2) Date: Oct. 16, 2020

(87) PCT Pub. No.: WO2019/203494
PCT Pub. Date: Oct. 24, 2019

(65) Prior Publication Data
US 2021/0374342 A1 Dec. 2, 2021

(30) Foreign Application Priority Data
Apr. 20, 2018 (KR) .................. 10-2018-0045933

(51) Int. Cl.
*G06F 3/04886* (2022.01)
*G06F 40/274* (2020.01)

(52) U.S. Cl.
CPC ........ *G06F 40/274* (2020.01); *G06F 3/04886* (2013.01)

(58) Field of Classification Search
CPC ...... G06F 16/951; G06F 30/20; G06F 30/327; G06F 30/3312; G06F 30/39;
(Continued)

(56) References Cited

U.S. PATENT DOCUMENTS

2013/0290106 A1 10/2013 Bradley et al.
2014/0344749 A1* 11/2014 Choi ................. H04M 1/72436
715/780

(Continued)

FOREIGN PATENT DOCUMENTS

KR 1020130120887 11/2013
KR 1020140064089 5/2014
(Continued)

OTHER PUBLICATIONS

PCT/ISA/210 Search Report issued on PCT/KR2019/004280, dated Jul. 17, 2019, pp. 5.
(Continued)

Primary Examiner — Rayeez R Chowdhury
(74) Attorney, Agent, or Firm — The Farrell Law Firm, P.C.

(57) ABSTRACT

Various embodiments of the present invention relate to an electronic device for inputting characters and a method of operation of same. At this time, the electronic device comprises a display, at least one processor, and a memory operatively connected to the processor, wherein the memory may store instructions that, when executed, cause the at least one processor to: detect at least one input word; determine a priority of a plurality of categories for a content on the basis of the at least one input word; determine at least one recommendation category on the basis of the determined priority of the plurality of categories; and control the display so as to display at least one content corresponding to the at least one determined recommendation category as at least one recommendation content for the at least one input word. Other embodiments may also be possible.

14 Claims, 25 Drawing Sheets

(58) Field of Classification Search
CPC .. G06F 16/9535; G06F 16/958; G06F 40/295; G06F 16/24578; G06F 40/211; G06F 40/30; G06F 16/24522; G06F 16/24575; G06F 16/248; G06F 16/9038; G06F 16/9562; G06F 21/32; G06F 21/44; G06F 2209/463; G06F 3/00; G06F 16/245; G06F 40/00; G06F 9/5072; G06F 16/285; G06F 21/31; G06F 2221/2141; G06F 9/50; G06F 9/5083; G06F 16/3329; G06F 16/338; G06F 3/0237; G06F 3/04886; G06F 40/216; G06F 40/274; G06F 40/284; G06F 16/148; G06F 16/156; G06F 16/196; G06F 16/24; G06F 9/445
See application file for complete search history.

(56) References Cited

U.S. PATENT DOCUMENTS

| | | | |
|---|---|---|---|
| 2015/0138095 | A1 | 5/2015 | Kim |
| 2016/0048326 | A1 | 2/2016 | Kim et al. |
| 2016/0301639 | A1* | 10/2016 | Liu ...................... G06Q 10/107 |
| 2017/0249017 | A1 | 8/2017 | Ryu et al. |
| 2018/0293601 | A1* | 10/2018 | Glazier .............. G06Q 30/0214 |
| 2021/0048895 | A1* | 2/2021 | Gralewicz ............ G06F 16/383 |

FOREIGN PATENT DOCUMENTS

| | | |
|---|---|---|
| KR | 1020140089751 | 7/2014 |
| KR | 1020140136595 | 12/2014 |
| KR | 1020150125287 | 11/2015 |
| KR | 1020160021524 | 2/2016 |
| KR | 1020166042610 | 4/2016 |
| KR | 1020160100195 | 8/2016 |
| KR | 1020170101730 | 9/2017 |
| KR | 1020180021316 | 3/2018 |

OTHER PUBLICATIONS

PCT/ISA/237 Written Opinion issued on PCT/KR2019/004280, dated Jul. 17, 2019, pp. 7.
Gboard-Google Keyboard, https://play.google.com/store/apps/details?id=com.google.android.inputmethod.latin, Aug. 4, 2020, p. 1.
Naver SmartBoard, https://play.google.com/store/apps/details?id=com.navercorp.android.smartboard&hl=ko, Aug. 23, 2020, p. 1.
Microsoft SwiftKey Keyboard, https://play.google.com/store/apps/details?id=com.touchtype.swiftkey, Sep. 11, 2020, p. 1.
Korean Office Action dated Aug. 11, 2022 issued in counterpart application No. 10-2018-0045933, 15 pages.

* cited by examiner

ELECTRONIC DEVICE FOR INPUTTING CHARACTERS AND METHOD OF OPERATION OF SAME

PRIORITY

This application is a National Phase Entry of International Application No. PCT/KR2019/004280, which was filed on Apr. 10, 2019, and claims priority to Korean Patent Application No. 10-2018-0045933, filed in the Korean Intellectual Property Office on Apr. 20, 2018, the content of each of which is incorporated herein by reference.

BACKGROUND

1. Field

The disclosure relates to an electronic device that inputs a character and an operation method thereof.

2. Related Art

With the development of information communication technologies and semiconductor technologies, electronic devices that provide various services have been developed. For example, various types of electronic devices are being widely utilized, such as mobile communication terminals, personal digital assistants (PDA), electronic organizers, smart phones, tablet personal computers (PC), wearable devices, and the like.

An electronic device provides various services using a character input function. For example, an electronic device may store information that is input using a character input function, or may transmit a message that is input using a character input function to another electronic device.

SUMMARY

Therefore, the disclosure has been made in view of the above-mentioned problems, and an aspect of the disclosure is to display at least one recommended word related to an input word on a screen in order to improve user convenience associated with inputting characters. For example, an electronic device may display a recommended word associated with an input word on a screen in order to reduce the amount of time spent correcting an input word or inputting characters. The scheme of displaying a recommended word may have a limitation on satisfying user demand for a wide variety of services.

Therefore, various embodiments of the disclosure provide a method and apparatus for providing various content related to an input word in an electronic device.

In accordance with an aspect of the disclosure, an electronic device may include: a display; at least one processor; and a memory operatively connected to the processor, wherein the memory stores instructions configured to, when executed, enable the at least one processor to: detect at least one input word; determine priorities of a plurality of categories based on the at least one input word; determine at least one recommended category based on the determined priorities of the plurality of categories; and control the display so as to display at least one piece of content corresponding to the at least one determined recommended category, as at least one recommended piece of content for the at least one input word.

In accordance with another aspect of the disclosure, an operation method of an electronic device may include: detecting at least one input word; determining priorities of a plurality of categories based on the at least one input word; determining at least one recommended category based on the determined priorities of the plurality of categories; and displaying at least one piece of content corresponding to the at least one determined recommended category as at least one recommended piece of content for the at least one input word.

In accordance with another aspect of the disclosure, an electronic device may include: a display; at least one processor; and a memory operatively connected to the processor, wherein the memory includes instructions configured to, when executed, enable the at least one processor to: control the display so as to display a message including at least one word associated with at least one recommended piece of content; detect user input performed on the at least one word; and control the display so as to display a recommended piece of content associated with the at least one word in response to detection of the user input.

According to various embodiments, when input of a word is detected, an electronic device displays content of various categories related to the input word, and provides various pieces of content without an additional search operation. According to various embodiments, an electronic device associates at least one recommended piece of content and at least one word included in an input message, stores the same, and/or transmits the same, so that a user can easily store and manage the at least one recommended piece of content, and can easily access a recommended piece of content at any time that the user desires.

DETAILED DESCRIPTION

Figure 1:
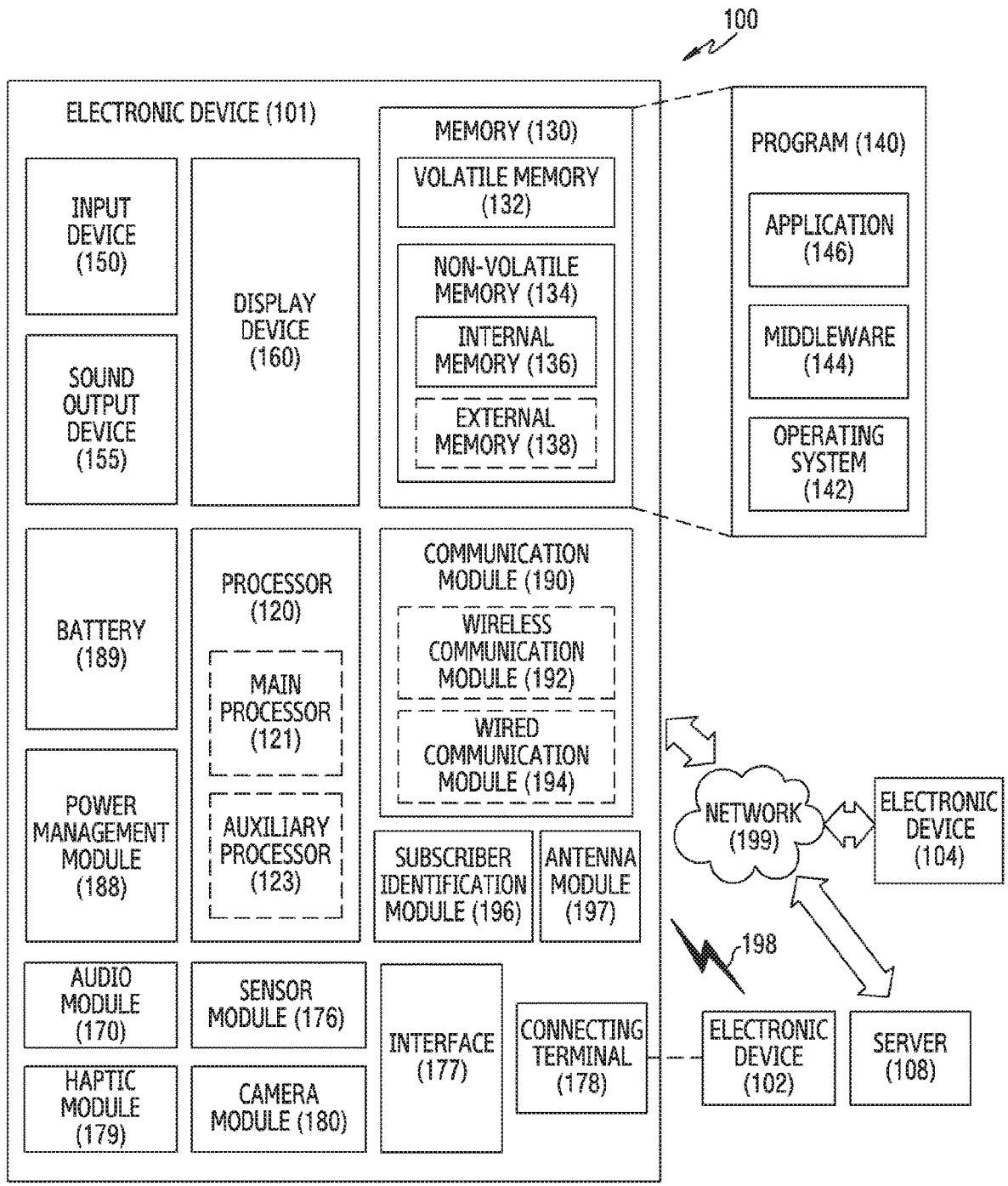
FIG. 1 is a block diagram of an electronic device 101 in a network environment 100 according to various embodiments.

Hereinafter, various embodiments of the disclosure will be described with reference to the accompanying drawings. It should be appreciated that the embodiments and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. A singular form of a noun corresponding to an item may include one or more of the things, unless the relevant context clearly indicates otherwise.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module

190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to various embodiments, the processor 120 may detect a character input event, and may control a display (e.g., the display 160) so that a virtual keyboard (or a virtual keypad) is displayed in at least a part of the display, in response to the detection of the character input event. The virtual keyboard (or a virtual keypad) may include at least one selected from among at least one character input button, at least one number input button, at least one symbol input button, or at least one input mode switch button. The character input event may include at least one of a user input event (e.g., a touch event) or a memo write event (or a memo add event) with respect to a character input enabled area (or character input window), or a user input event (a touch event) with respect to a search word input area (e.g., or a search word input window).

According to various embodiments, if input of at least one word (e.g., a word or a phrase) via a virtual keyboard is detected, the processor 120 may determine at least one recommended category among a plurality of categories associated with a piece of content, based on the at least one input word, in order to determine a recommended piece of content related to the at least one input word. The plurality of categories may be classifications of various pieces of content. For example, the plurality of categories may include at least one of a text category (or a word category), a category associated with a piece of content stored in a device (or a device category), a category associated with a piece of content obtainable from a server (a server category), a category associated with image content (or an image category), a category associated with video content (or a video category), a category associated with music content (or a music category), a category associated with contact information content (or a contact information category), a category associated with advertising content (or an advertising category), or a category associated with location-related content (or a location category). The above-mentioned categories are merely examples, and various embodiments of the disclosure are not limited thereto.

According to an embodiment, the processor 120 may determine priorities of the plurality of categories based on at least one input word, and may determine at least one recommended category based on the priorities of the plurality of categories. The priority of each of the plurality of categories may be determined based on at least one of a fitness of recommendation of each category, the entire profile of each category, a user profile of each category, or an advertising cost. The fitness of recommendation of each category may be determined based on at least one selected from among a word that is currently input, at least one other input word included in the entire sentence and/or paragraph that includes the currently input word, or a predetermined context. The currently input word may be a word displayed at a location where a cursor indicating a current input location is displayed, or a word displayed at a location that is closest to the location where a cursor is displayed. The entire profile of each category may include a plurality of users' usage rates (or preferences) of each category, a plurality of users' usage rates (or preferences) of content items in each category, or necessary content items. The processor 120 may receive the entire profile of each category from a server. The user profile of each category may include the electronic device 101's user's usage rate (or preference) for each category, the electronic device 101's user's usage rate (or preference) for each category in a word-input-enabled application, the number of pieces of content related to an input word in each category, or a usage rate of a piece of content via a server. For example, the processor 120 may determine the fitness of recommendation of each category based on an input word, and may determine the priority of each of the plurality of categories based on at least one of the fitness of recommendation of each category, the entire profile of each category, or the user profile of each category. As another example, the processor 120 may determine the highest priority for a predetermined category among the plurality of categories. For example, the processor 120 may determine the highest priority for an advertising category, and may determine priorities for the remaining categories based on the fitness of recommendation, the entire profile of each category, or the user profile of each category.

According to an embodiment, the processor 120 may determine a recommended category for at least one input word based on the number of recommended categories and the priority of each of the plurality of categories. According to an embodiment, the processor 120 may determine the number of recommended categories based on at least one input word. For example, the processor 120 may determine at least one recommended word corresponding to a text category based on at least one input word, and may determine the number of recommended categories based on the accuracy (or similarity) of the recommended word. At least one recommended word may be determined based on a word recommendation engine. The processor 120 may determine the number of recommended categories based on the accuracy of the at least one determined recommended word and the maximum number of pieces of content capable of being displayed in a content recommendation area. The content recommendation area may include an area in which at least one piece of content related to at least one input word is displayed, and may be referred to as a content recommendation window, a word recommendation area, or a word recommendation window. At least one of the location or the size of the content recommendation area may be set and/or changed by a designer and/or a user. The maximum number of pieces of content capable of being displayed in the content recommendation area may be changed by a designer and/or user, and may be changed based on at least one input word. If the accuracy of at least one recommended word satisfies a first designated condition (e.g., if the accuracy of the recommended word is greater than or equal to a designated accuracy), the processor 120 may determine the number of recommended words to be a first value, and may determine the number of recommended categories based on the determined number of recommended words. The number of recommended categories may be determined in consideration of a text category. As another example, if the accuracy of at least one recommended word satisfies a second designated condition (e.g., if the accuracy of the recommended word is less than a designated accuracy), the processor 120 may determine the number of recommended words to be a second value, and may determine the number of recommended categories based on the determined number of recommended words. The first value may be smaller than the second value. As the number of recommended words becomes lower, the number of recommended categories may become higher. The number of recommended categories may be smaller than or equal to the maximum number of pieces of content capable of being displayed in the content recommendation area. The above-mentioned scheme of determining the number of recommended categories is an example, but various embodiments of the disclosure are not limited thereto. For example, the number of recommended categories may be determined based on another scheme. According to an embodiment, the processor 120 may take into consideration whether a category that is set to be fixedly displayed in the content recommendation area is present when determining the number of recommended categories. For example, if content related to a text category and/or an advertising category is set to be fixedly displayed in the content recommendation area, the processor 120 may determine the number of recommendation categories so that the content of the text category and/or advertising category is fixedly displayed in the content recommendation area.

According to an embodiment, the processor 120 may determine a recommended category for at least one input word based on the number of recommended categories and the priority of each of the plurality of categories. For example, if the number of recommended categories is N, the processor 120 may determine N categories having high priorities to be recommended categories. As another example, if the number of recommended categories is N, and a text category and an advertising category are set to be fixedly displayed, the processor 120 may determine the text category and the advertising category to be recommended categories, and may determine N−2 categories, having high priorities among the categories remaining after excluding the text category and the advertising category, to be recommended categories.

According to various embodiments, the processor 120 may perform control so that a recommended piece of content corresponding to the determined recommended category is displayed on the display. According to an embodiment, the processor 120 may search for at least one piece of content related to at least one input word for each determined recommended category. The processor 120 may determine at least one piece of content retrieved for each recommended category to be a recommended piece of content, and may control the display so as to display the recommended content in the content recommendation area. For example, if the determined recommended categories are a text category, an advertising category, and an image category, the processor 120 may control the display so as to display at least one recommended word, at least one piece of advertising content, and at least one piece of image content in the content recommendation area. As another example, if the determined recommended category is a text category, an advertising category, and an image category, the processor 120 may control the display so as to display at least one recommended word, at least one piece of content retrieved within a device, and at least one piece of content obtained from a server in the content recommendation area. If a plurality of pieces of content related to at least one input word is retrieved from each category, the processor 120 may determine at least one recommended piece of content based on the priorities of the plurality of pieces of content or an association between an input word and each of the plurality of pieces of content.

According to various embodiments, the processor 120 may detect first user input performed on a first area in the state in which recommended content related to at least one input word is displayed in the content recommendation area, and may control the display so as to display at least one other piece of recommended content corresponding to a predetermined category based on the first user input in the content recommendation area. The first area may include a content recommendation area, an area in which at least one input word is displayed, and at least a part of an area in which a keyboard is displayed. The first user input may include at least one of a drag, a double touch, a long touch, or a pressure touch. According to an embodiment, if first user input performed on the first area is detected, the processor 120 may select a recommended category corresponding to the attribute (e.g., a drag direction, the number of touches, a touch time, or a touch location) of the first user input among the recommended categories, and may control the display so as to display at least one other piece of recommended content corresponding to the selected recommended category in the content recommendation area. For example, based on an area (or a location) in which a recommended piece of content corresponding to a recommended category is displayed and the drag direction of the first user input, the processor 120 may select one of the recommended categories and may control the display so as to display at least one other piece of recommended content corresponding to the selected recommended category in the content recommendation area.

According to various embodiments, the processor 120 may detect second user input performed on a second area in the state in which recommended content related to at least one input word is displayed in the content recommendation area, may extend the content recommendation area based on the second user input, and may control the display so as to display at least one other piece of recommended content in the extended area. The second area may include an area in which a first symbol (e.g., an extension icon) related to extension of the content recommendation area is displayed, or a designated area. The second user input may include at least one of a touch, a double touch, a long touch, or a pressure touch. The content recommendation area may be extended to include at least a part of an area in which a virtual keyboard is displayed. For example, the extended area may include at least a part of the area in which the virtual keyboard is displayed. According to an embodiment, if the second user input performed on the second area is detected, the processor 120 may extend the content recommendation area, and may control the display so as to display at least one other piece of recommended content in the extended area based on the category of at least one recommended piece of content that was displayed in the content recommendation area before extension. For example, the processor 120 may identify the category of at least one recommended piece of content that was displayed in the content recommendation area before extension, and may control the display so as to display at least one other piece of recommended content for each identified category in the extended area. For example, in the case in which a recommended word, a recommended advertisement, and a recommended image were displayed in the content recommendation area before extension, the processor 120 may control the display so as to display at least one other word corresponding to a text category, at least one other advertisement corresponding to an advertising category, and at least one other image corresponding to an image category in the extended area. As another example, in the case in which only recommended content corresponding to a device category was displayed in the content recommendation area before extension, the processor 120 may control the display so as to display at least one other piece of recommended content corresponding to the device category in the extended area. According to an embodiment, if third user input performed on the second area is detected in the state in which the content recommendation area is extended, the processor 120 may reduce the content recommendation area so as to restore the original size thereof. For example, if the third user input performed on the second area is detected in the state in which the content recommendation area is extended, the processor 120 may control the display so as to remove the display of the extended area and to display only the content recommendation area before extension. The third user input may include at least one of a touch, a double touch, a long touch, or a pressure touch.

According to various embodiments, the processor 120 may detect user input performed on at least one recommended piece of content, and may display detailed information associated with the at least one recommended piece of content on which the user input is detected. According to an embodiment, if user input, performed to select a recommended piece of content displayed in the content recommendation area or the extended area, is detected, the processor 120 may display a first popup window including the detailed information associated with the at least one selected recommended piece of content. The detailed information may include at least one of an image, text, location information, a uniform resource identifier (URI), or a symbol related to a recommended piece of content. The above-mentioned information is merely an example, and the various embodiments are not limited thereto. For example, the detailed information may include various other information (or content). The first popup window may be displayed in at least some of an area in which an input word is displayed, a virtual keyboard area, and a content recommendation area. The first popup window may include at least one of an edit symbol (or an edit button) for editing detailed information of at least one recommended piece of content, an enter symbol (or an enter button) for associating detailed information of recommended content with at least one input word, or a cancel symbol (or a cancel button) for stopping display of the first popup window, According to an embodiment, if user input performed on the edit symbol included in the first popup window is detected, the processor 120 may provide a user interface capable of editing (e.g., deleting, adding, or changing) detailed information of at least one piece of content. According to an embodiment, if user input performed on the enter symbol included in the first popup window is detected, the processor 120 may associate detailed information of at least one recommended piece of content with at least one input word, may store the same, and may stop the display of the first popup window. The processor 120 may display a second symbol, indicating the existence of associated recommended content, in an area in which at least one input word is displayed or in an area surrounding the area in which the at least one input word is displayed. According to an embodiment, if user input performed on the cancel symbol included in the first popup window is detected, the processor 120 may stop the display of the first popup window.

According to various embodiments, the processor 120 may store a message (or memo), including at least one input word associated with at least one recommended piece of content, in the memory 130, or may transmit the same to another electronic device (e.g., the electronic device 102 or the electronic device 104).

According to various embodiments, the processor 120 may obtain a message (or memo) including at least one first word associated with at least one recommended piece of content from the memory 130 or another electronic device (e.g., the electronic device 102 or the electronic device 104), and may perform control so as to display the obtained message in the display. According to an embodiment, the processor 120 may control the display so as to display the second symbol indicating the existence of a recommended piece of content associated with the first word in an area in which the at least one first word included in the obtained message is displayed or in an area surrounding the area in which the at least one first word is displayed. According to an embodiment, the processor 120 may detect user input performed on the first word or the second symbol, and may control the display so as to display a second popup window including the detailed information associated with the at least one recommended piece of content associated with the first word. The second popup window may be displayed in an area adjacent to the first word. The display area for the second popup window may be set and/or changed by a designer and/or a user.

According to various embodiments, an electronic device (e.g., the electronic device 101 of FIG. 1) may include: a display (e.g., the display device 160 of FIG. 1); at least one processor (e.g., the processor 120 of FIG. 1); and a memory (e.g., the memory 130 of FIG. 1) operatively connected to the processor 120, wherein the memory 130 may store instructions configured to, when executed, enable the at least one processor 120 to: detect at least one input word; determine priorities of a plurality of categories associated with a piece of content based on the at least one input word; determine at least one recommended category based on the determined priorities of the plurality of categories; and control the display so as to display at least one piece of content corresponding to the at least one determined recommended category, as at least one recommended piece of content for the at least one input word.

According to various embodiments, the at least one piece of content may include at least one of text, image content, advertising content, video content, music content, contact information content, or location-related content.

According to various embodiments, the instructions may enable the processor 120 to determine the priorities of the plurality of categories based additionally on at least one of a usage rate of each category, a preference for each category, an advertising cost, a predetermined context, or the number of pieces of content related to an input word among content included in each category.

According to various embodiments, the instructions may enable the processor 120 to: determine at least one recommended word based on the at least one input word; determine the number of recommended categories based on the accuracy of the at least one determined recommended word; and determine the at least one recommended category based on the determined number of recommended categories and the priorities of the plurality of categories.

According to various embodiments, the instructions may enable the processor 120 to: detect first input in a state in which the at least one recommended piece of content is displayed; and display at least one other piece of recommended content corresponding to the same category as a first recommended piece of content corresponding to an attribute of the first input among the at least one recommended piece of content, in response to the detection of the first input.

According to various embodiments, the attributes of the first input may include at least one of a drag direction, the number of touches, a touch time, or a touch location.

According to various embodiments, the instructions may enable the processor 120 to: detect second input in a state in which the at least one recommended piece of content is displayed; and additionally display at least one other piece of recommended content corresponding to the same category as the at least one recommended piece of content in response to the detection of the second input.

According to various embodiments, the instructions may enable the processor 120 to: display the at least one recommended piece of content in a first area; and display the at least one other piece of recommended content in a second area, wherein the second area includes at least a part of a virtual keyboard.

According to various embodiments, the instructions may enable the processor 120 to: detect third input performed on the at least one recommended piece of content; and display detailed information of the at least one recommended piece of content in response to the detection of the third input.

According to various embodiments, the instructions may enable the processor 120 to: detect fourth input in a state in which the detailed information of the at least one recommended piece of content is displayed; and in response to the detection of the fourth input, associate the at least one input word with the detailed information of the at least one recommended piece of content and store the same.

According to various embodiments, the instructions may enable the processor 120 to display a visual effect indicating that the at least one input word is associated with the at least one recommended piece of content in response to the detection of the fourth input.

According to various embodiments, the instructions may enable the processor 120 to: detect fifth input in the state in which the detailed information of the at least one recommended piece of content is displayed; and provide a user interface that is capable of editing the detailed information of the at least one recommended piece of content in response to the detection of the fifth input.

According to various embodiments, the instructions may enable the processor 120 to: detect user input performed on the at least one input word in the state in which a message including the at least one input word associated with the detailed information of the at least one recommended piece of content is displayed; and display the detailed information of the recommended content associated with the at least one word in response to the detection of the user input.

According to various embodiments, an electronic device (e.g., the electronic device 101 of FIG. 1) may include: a display (e.g., the display device 160 of FIG. 1); at least one processor (e.g., the processor 120 of FIG. 1); and the memory 130 operatively connected to the processor 120, wherein the memory 130 may include instructions configured to, when executed, enable the at least one processor 120 to: control the display 160 so as to display a message including at least one word associated with at least one recommended piece of content; detect user input performed on the at least one word; and control the display 160 so as to display a recommended piece of content associated with the at least one word in response to the detection of the user input.

According to various embodiments, the recommended content may include at least one of image content, advertising content, video content, music content, contact information content, or location-related content.

Figure 2:
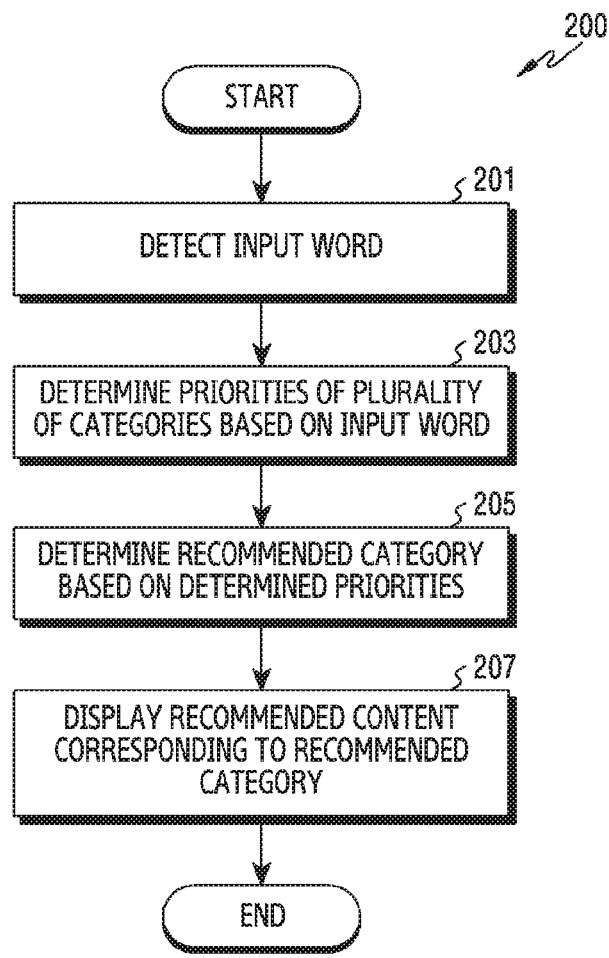
FIG. 2 is a flowchart illustrating a process in which an electronic device displays a recommended piece of content according to various embodiments.
Figure 3:
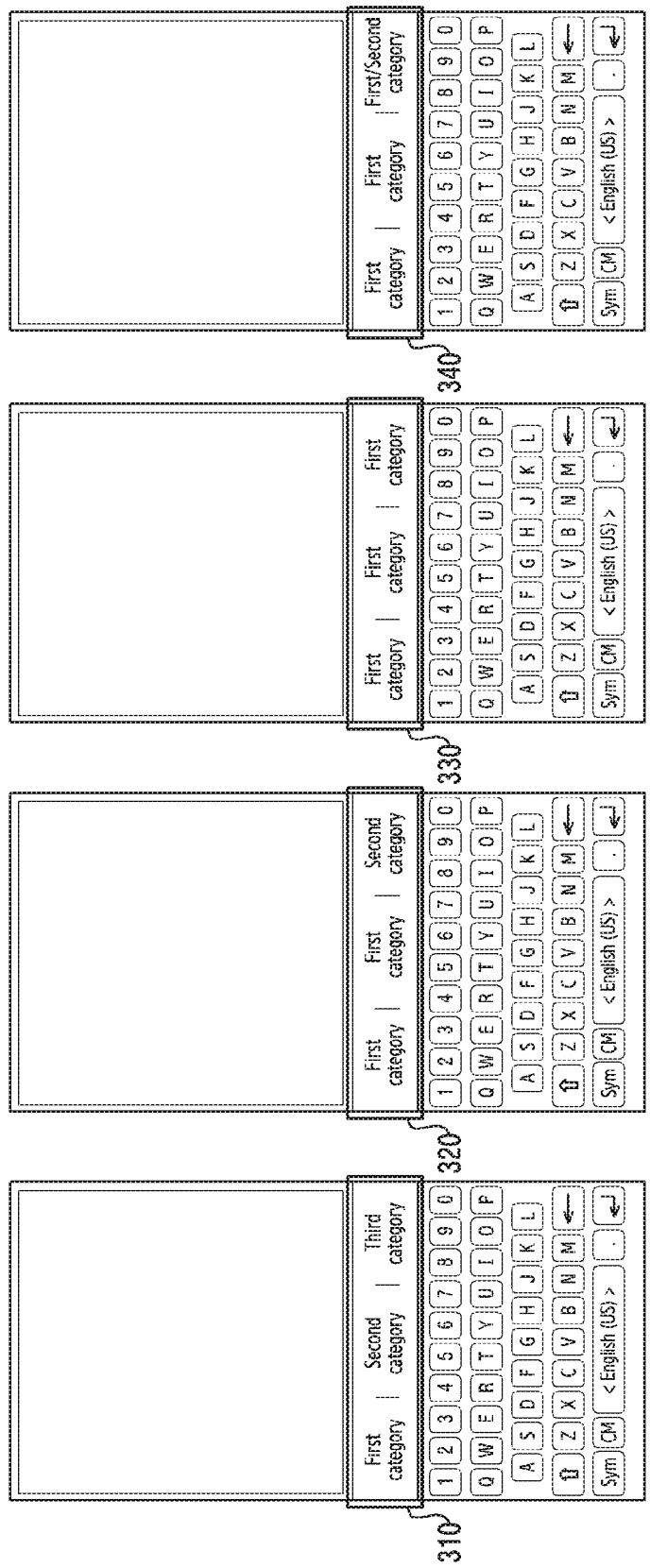
FIG. 3 is a diagram illustrating the configuration of a screen that displays a recommended piece of content in an electronic device according to various embodiments.
Figure 4:
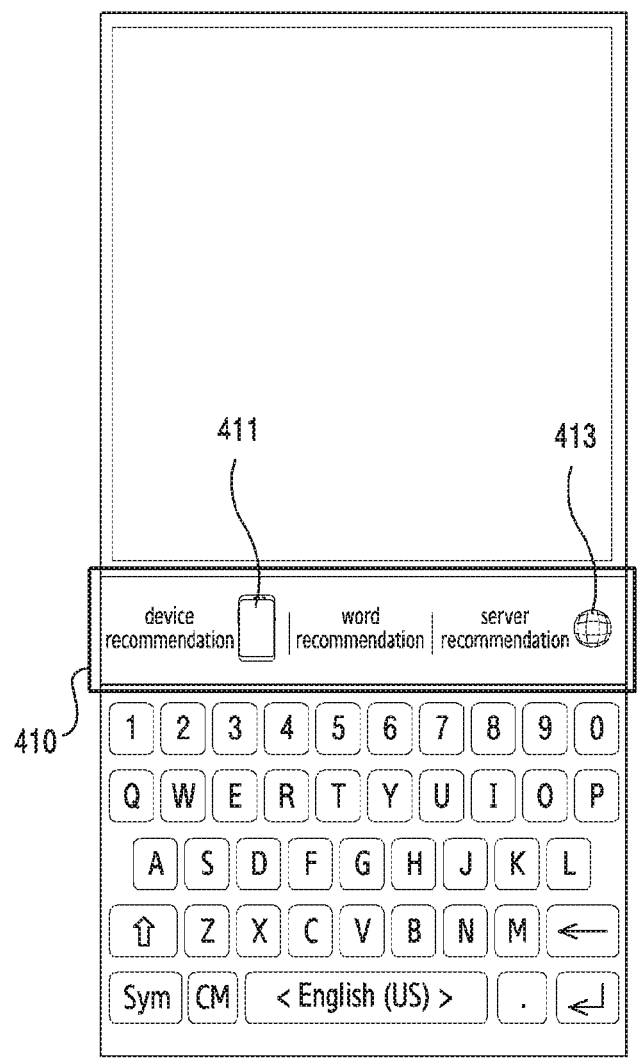
FIG. 4 is a diagram illustrating the configuration of a screen that displays a recommended piece of content in an electronic device according to various embodiments.
Figure 5:
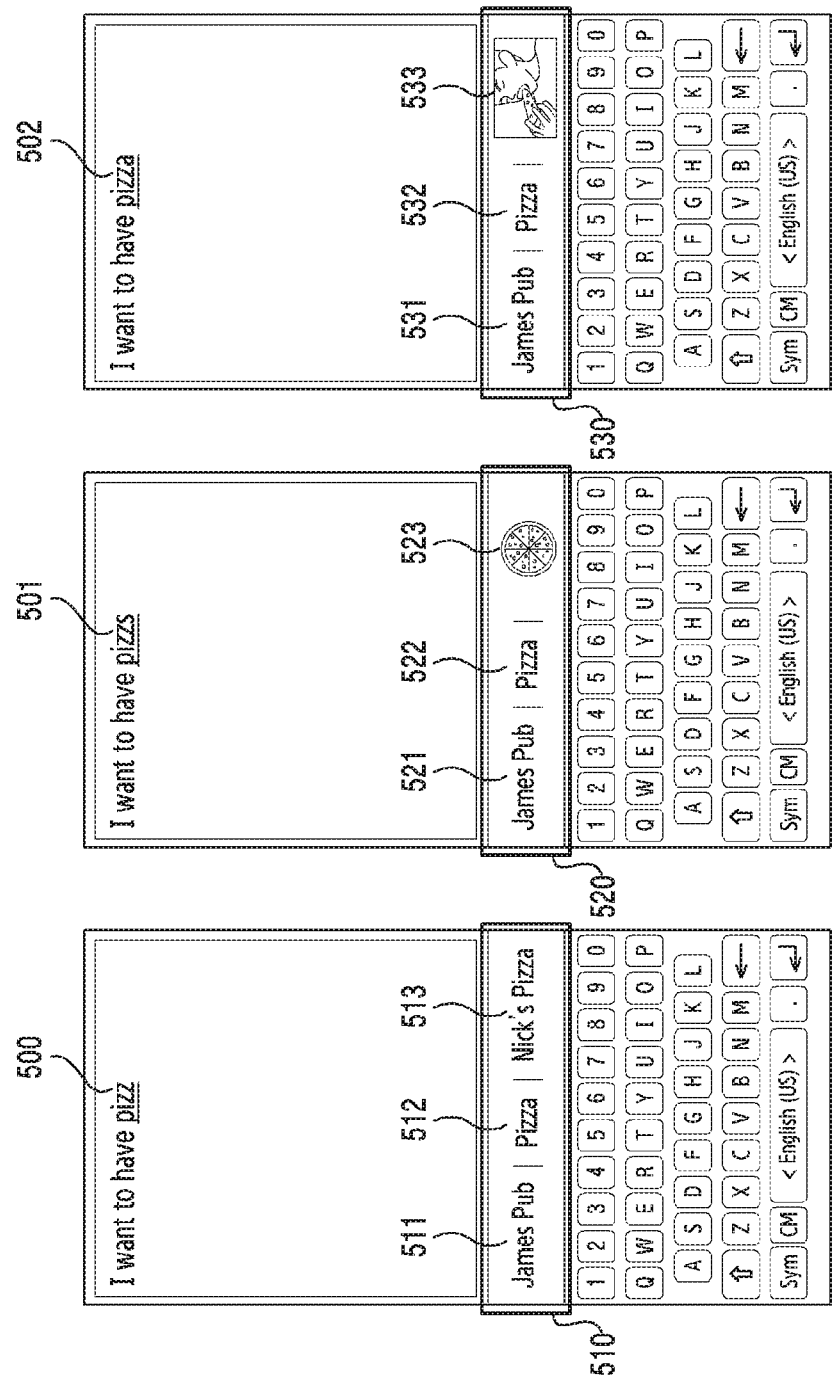
FIG. 5 is a diagram illustrating the configuration of a screen that displays a recommended piece of content in an electronic device according to various embodiments.

FIG. 2 is a flowchart 200 illustrating a process in which an electronic device displays a recommended piece of content according to various embodiments. In the embodiment provided hereinafter, operations may be performed sequentially, but are not necessarily limited thereto. For example, the order of operations may be changed, or at least two operations may be performed in parallel. Here, the electronic device of FIG. 2 may be the electronic device 101 of FIG. 1. Hereinafter, at least some operations of the electronic device (e.g., the processor 120) will be described with reference to FIGS. 3 to 5. FIGS. 3 to 5 are diagrams illustrating the configuration of a screen that displays a recommended piece of content in an electronic device according to various embodiments.

Referring to FIG. 2, an electronic device (e.g., the processor 120 of FIG. 1) according to various embodiments may detect input of at least one word in operation 201. According to an embodiment, the processor 120 may detect that at least one word (e.g., a word, a phrase, or a character string) is input via a virtual keyboard.

According to various embodiments, the electronic device the processor 120) may determine priorities of a plurality of categories based on the at least one input word in operation 203. According to an embodiment, the plurality of categories may include at least one of a text category (or word category), a category associated with a piece of content stored in a device (or a device category), a category associated with a piece of content obtainable from a server (a server category), a category associated with image content (or an image category), a category associated with video content (or a video category), a category associated with music content (or a music category), a category associated with contact information content (or a contact information category), a category associated with advertising content (or an advertising category), or a category associated with location-related content (or a location category). The above-mentioned categories are merely examples, and various embodiments of the disclosure are not limited thereto. According to an embodiment, the priority of each of the plurality of categories may be determined based on at least one of a fitness of recommendation of each category, the entire profile of each category, a user profile of each category, or an advertising cost. For example, the processor 120 may determine the fitness of recommendation of each category based on an input word, and may determine the priorities of the plurality of categories based on at least one of the fitness of recommendation of each category, the entire profile of each category, or the user profile of each category. As another example, the processor 120 may determine the highest priority for a predetermined category among the plurality of categories. For example, the processor 120 may determine the highest priority for an advertising category, and may determine priorities for the remaining categories based on the fitness of recommendation, the entire profile of each category, or the user profile of each category.

According to various embodiments, the electronic device (e.g., the processor 120) may determine at least one recommended category based on the priorities of the plurality of categories in operation 205. According to an embodiment, the processor 120 may determine the at least one recommended category among the plurality of categories based on the number of recommended categories and the priority of each of the plurality of categories. The number of recommended categories may be set by a designer and/or a user, or may be determined based on at least one input word. For example, the processor 120 may determine at least one recommended word based on at least one input word, and may determine the number of recommended categories based on the accuracy (or similarity) of the at least one recommended word. According to an embodiment, the processor 120 may determine the number of recommended categories based on the number of categories which are set to be fixedly displayed in a content recommendation area. According to an embodiment, the processor 120 may determine a recommended category for the at least one input word based on the number of recommended categories and the priority of each of the plurality of categories. For example, if the number of recommended categories is N, the processor 120 may determine N categories having high priorities to be recommended categories. As another example, if the number of recommended categories is N, and a text category and an advertising category are set to be fixedly displayed, the processor 120 may determine the text category and the advertising category to be recommended categories, and may determine N–2 categories having high priorities among the categories remaining after excluding the text category and the advertising category to be recommended categories.

According to various embodiments, the electronic device (e.g., the processor 120) may display a recommended piece of content corresponding to the at least one determined recommended category in operation 207. According to an embodiment, the processor 120 may search for at least one piece of content related to at least one input word for each determined recommended category, and may control the display (e.g., the display device 160 of FIG. 1) so as to display the at least one retrieved piece of content in the content recommendation area. For example, the processor 120 may control the display so as to display a piece of content of each of a first category, a second category, and a third category in a content recommendation area 310, as illustrated in the first screen configuration of FIG. 3. As another example, the processor 120 may control the display so as to display two pieces of content corresponding to the first category and a piece of content corresponding to the second category in a content recommendation area 320, as illustrated in the second screen configuration of FIG. 3. As another example, the processor 120 may control the display so as to display three pieces of content corresponding to the first category in a content recommendation area 330, as illustrated in the third screen configuration of FIG. 3. As another example, the processor 120 may control the display so as to display two pieces of content corresponding to the first category and a piece of content corresponding to one of the second category and the third category in a content recommendation area 340, as illustrated in the fourth screen configuration of FIG. 3. According to an embodiment, the processor 120 may control the display so as to additionally display a symbol, indicating the category of at least one recommended piece of content, in the content recommendation area. For example, as illustrated in FIG. 4, the processor 120 may control the display so as to display a recommended piece of content for each of a device category, a text category, and a server category in a content recommendation area 410, and to additionally display a symbol 411 indicating the device category and a symbol 413 indicating the server category. Particularly, as illustrated in FIG. 5, the processor 120 may control the display so as to display various recommended content in association with an input word 500, "pizz". For example, as illustrated in the first screen configuration of FIG. 5, if the input word (or character string) 500. "pizz", is detected, the processor 120 may control the display so as to display the name and/or location 511 of a pizza store which is located closest to the current location of the electronic device 101, a recommended word 512, "Pizza", and the name and/or location 513 of a pizza store that a plurality of users prefer, which is obtained from a server, in a content recommendation area 510. As illustrated in the second screen configuration of FIG. 5, if an input word (or a character string) 501, "pizzs" is detected, the processor 120 may control the display so as to display the name and/or location 521 of a pizza store which is located closest to the current location of the electronic device 101, a recommended word 522, "Pizza", and advertising content 523 related to pizza, in a content recommendation area 520. As illustrated in the third screen configuration of FIG. 5, if an input word 502, "pizza", is detected, the processor 120 may control the display so as to display the name and/or location 531 of the pizza store that is located closest to the current location of the electronic device 101, a recommended word 532, "Pizza", and a pizza-related image 533 which is stored in the memory of the electronic device 101, in a content recommendation area 530.

Figure 6:
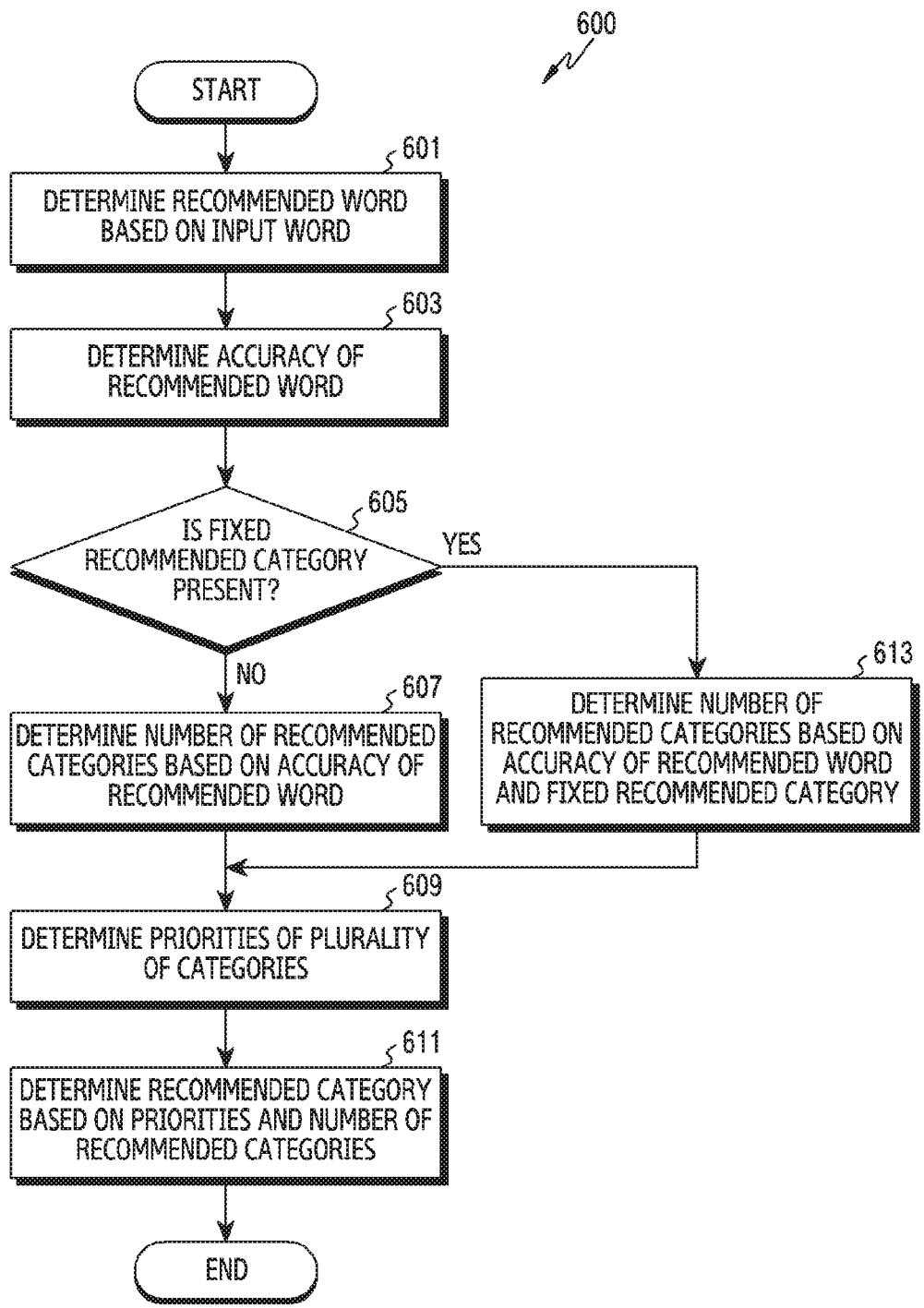
FIG. 6 is a flowchart illustrating a process in which an electronic device determines a recommended category based on an input word according to various embodiments.

FIG. 6 is a flowchart 600 illustrating a process in which an electronic device determines a recommended category based on an input word according to various embodiments. Operations described below with reference to FIG. 6 are various embodiments of operations 203 and 205 of FIG. 2. In the embodiment provided hereinafter, operations may be performed sequentially, but are not necessarily limited thereto. For example, the order of operations may be changed, or at least two operations may be performed in parallel. Here, the electronic device of FIG. 6 may be the electronic device 101 of FIG. 1.

Referring to FIG. 6, an electronic device (e.g., the processor 120 of FIG. 1) according to various embodiments may determine at least one recommended word based on at least one input word in operation 601. According to an embodiment, the processor 120 may determine at least one recommended word for at least one input word using a word recommendation engine (or a word recommendation program) installed in advance in the electronic device 101.

According to various embodiments, the electronic device (e.g., the processor 120) may determine the accuracy (or similarity) of the recommended word in operation 603. The accuracy of the recommended word and the at least one input word may be determined using various schemes which are publicly known to those skilled in the art.

According to various embodiments, the electronic device (e.g., the processor 120) may determine whether a fixed recommended category is present in operation 605. The fixed recommended category may include a category which is set to be fixedly displayed in a content recommendation area. The fixed recommended category may be set and/or changed by a designer and/or a user. For example, the processor 120 may identify that at least one of an advertising category or a text (or word) category among the plurality of categories is set to be fixedly displayed in the content recommendation area.

According to various embodiments, if a fixed recommended category is not present, the electronic device (e.g., the processor 120) may determine the number of recommended categories based on the accuracy of the recommended word in operation 607. For example, the processor 120 may determine the number of recommended categories based on the accuracy of the at least one determined recommended word and the maximum number of pieces of content capable of being displayed in the content recommendation area. The content recommendation area may include an area in which at least one piece of content related to at least one input word is displayed, and may be referred to as a content recommendation window, a word recommendation area, or a word recommendation window. At least one of the location or the size of the content recommendation area may be set and/or changed by a designer and/or a user. The maximum number of pieces of content capable of being displayed in the content recommendation area may be changed by a designer and/or a user, and may be changed based on at least one input word. If the accuracy of the at least one recommended word satisfies a first designated condition (e.g., if the accuracy of the recommended word is greater than or equal to a designated accuracy), the processor 120 may determine the number of recommended words to be a first value, and may determine the number of recommended categories based on the determined number of recommended words. The number of recommended categories may be determined by taking into consideration the text category corresponding to the recommended word. As another example, if the accuracy of the at least one recommended word satisfies a second designated condition (e.g., if the accuracy of the recommended word is less than a designated accuracy), the processor 120 may determine the number of recommended words to be a second value, and may determine the number of recommended categories based on the determined number of recommended words. The first value may be smaller than the second value. As the number of recommended words becomes lower, the number of recommended categories may become higher. The number of recommended categories may be smaller than or equal to the maximum number of pieces of content capable of being displayed in the content recommendation area. The above-mentioned scheme of determining the number of recommended categories is merely an example, and various embodiments of the disclosure are not limited thereto.

According to various embodiments, if a fixed recommended category is present, the electronic device (e.g., the processor 120) may determine the number of recommended categories based on the accuracy of the recommended word and the fixed recommended category in operation 613. For example, the processor 120 may determine the number of recommended categories based on the accuracy of the at least one determined recommended word, the maximum number of pieces of content capable of being displayed in the content recommendation area, and the number of fixed recommended categories. If the accuracy of the at least one recommended word satisfies the first designated condition (e.g., if the accuracy of the recommended word is greater than or equal to a designated accuracy), the processor 120 may determine the number of recommended words to be a third value, and may determine the number of recommended categories based on the determined number of recommended words and the number of fixed recommended categories. As another example, if the accuracy of the at least one recommended word satisfies the second designated condition (e.g., if the accuracy of the recommended word is less than a designated accuracy), the processor 120 may determine the number of recommended words to be a fourth value, and may determine the number of recommended categories based on the determined number of recommended words and the number of fixed recommended categories. The third value may be smaller than the fourth value. As the number of recommended words becomes lower, the number of recommended categories may become higher. The number of recommended categories may be smaller than or equal to the maximum number of pieces of content capable of being displayed in the content recommendation area. The number of recommended categories may be greater than or equal to the number of fixed categories.

According to various embodiments, the electronic device (e.g., the processor 120) may determine the priorities of the plurality of categories in operation 609. The priorities of the plurality of categories may be determined in a manner that is at least partially the same as the description provided with reference to operation 203 of FIG. 2.

According to various embodiments, the electronic device (e.g., the processor 120) may determine a recommended category based on the determined priorities and the determined number of recommended categories in operation 611. For example, if the number of recommended categories is N, the processor 120 may determine N categories having high priorities to be recommended categories. As another example, if the number of recommended categories is N and two fixed recommended categories (e.g., a text category and an advertising category) are present, the processor 120 may determine the two fixed recommended categories to be recommended categories, and may determine N−2 categories having high priorities among the remaining categories to be recommended categories.

Figure 7:
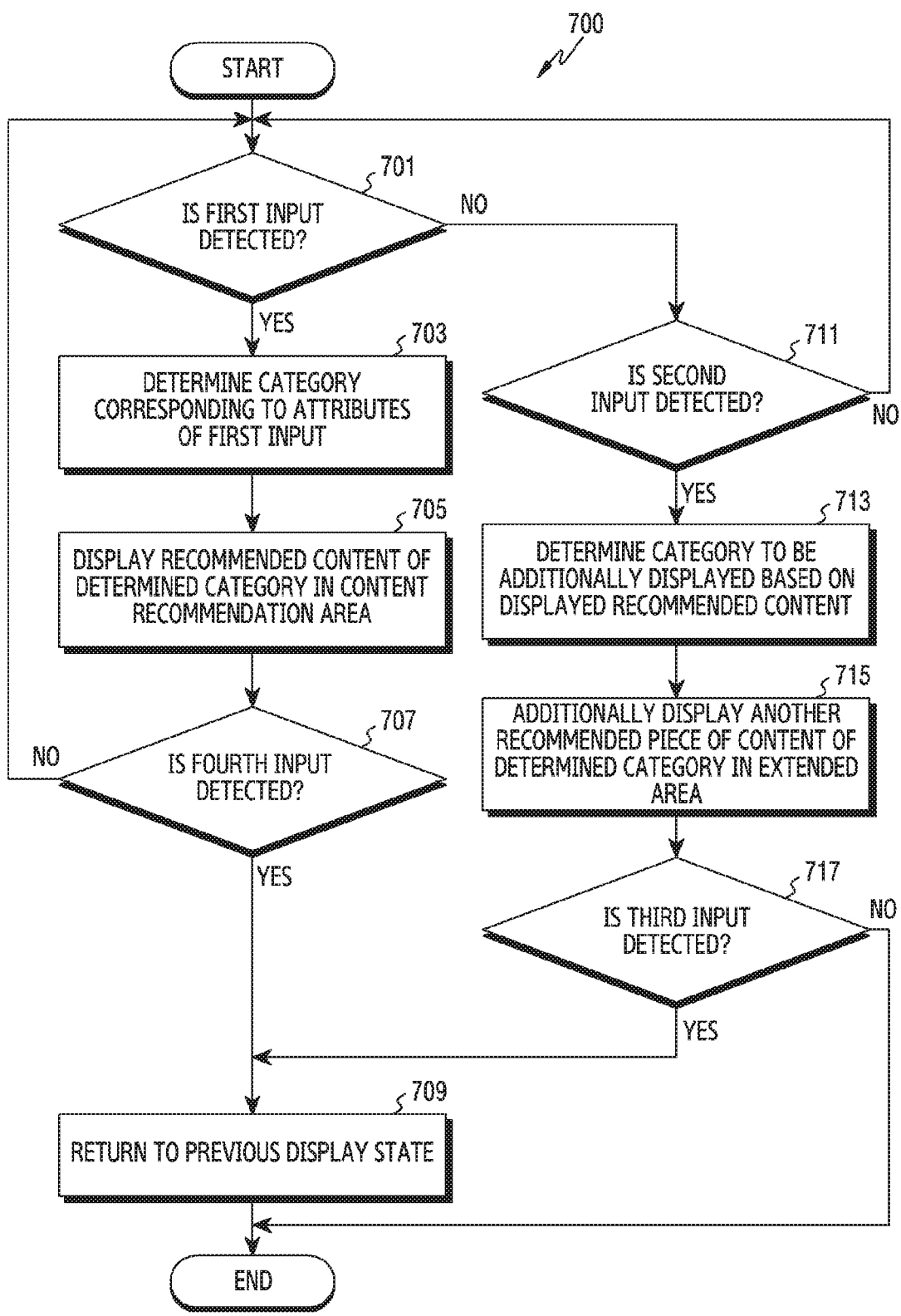
FIG. 7 is a flowchart illustrating a process in which an electronic device displays another recommended piece of content according to various embodiments.

FIG. 7 is a flowchart illustrating a process in which an electronic device displays another recommended piece of content according to various embodiments. In the embodiment provided hereinafter, operations may be performed sequentially, but are not necessarily limited thereto. For example, the order of operations may be changed, or at least two operations may be performed in parallel. Here, the electronic device of FIG. 7 may be the electronic device 101 of FIG. 1. According to an embodiment, the operations of FIG. 7 may be performed after the operations of FIG. 2 are performed. Hereinafter, at least some operations of FIG. 7 will be described with reference to FIGS. 8A to 10B. FIGS. 8A to 10B are diagrams illustrating the configuration of a screen that displays another recommended piece of content in an electronic device according to various embodiments.

Referring to FIG. 7, an electronic device (e.g., the processor 120 of FIG. 1) according to various embodiments may determine whether first input is detected in operation 701. According to an embodiment, the processor 120 may determine whether the first input performed on a first area is detected in the state in which recommended content related to at least one input word is displayed in a content recommendation area. The first area may include the content recommendation area, an area in which at least one input word is displayed, and at least a part of an area in which a keyboard is displayed. The first user input may include at least one of a drag, a double touch, a long touch, or a pressure touch.

According to various embodiments, if the first input is detected, the electronic device (e.g., the processor 120) may determine a category corresponding to an attribute of the first input in operation 703. The attribute of the first user input may include at least one of a drag direction, the number of touches, a touch time, or a touch location. For example, the processor 120 may determine one of at least one category corresponding to the content displayed in the content recommendation area based on the drag direction of the first input. As another example, the processor 120 may determine one of the at least one category corresponding to the content displayed in the content recommendation area based on the number of touches and the touch location associated with the first input.

Figure 8A:
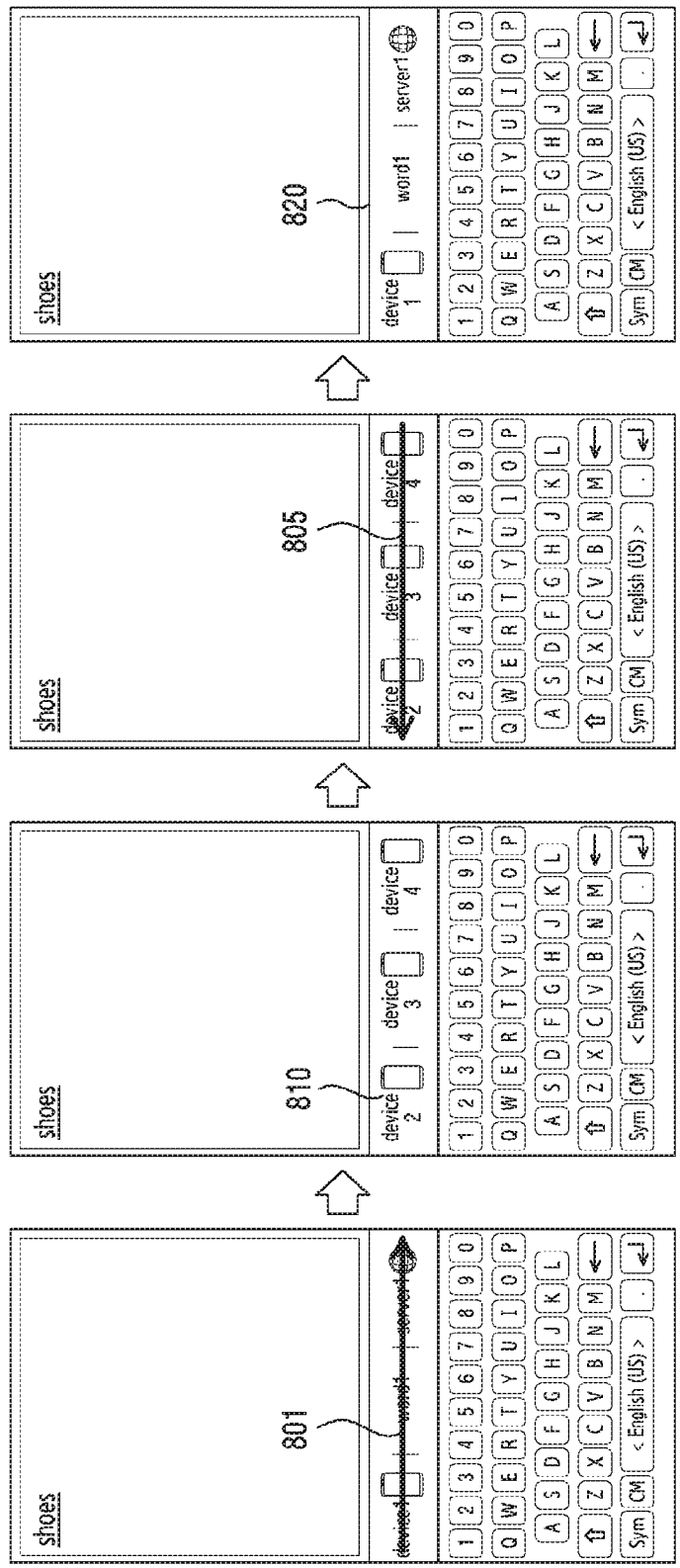
FIG. 8A is a diagram illustrating the configuration of a screen that displays another recommended piece of content in an electronic device according to various embodiments.
Figure 8B:
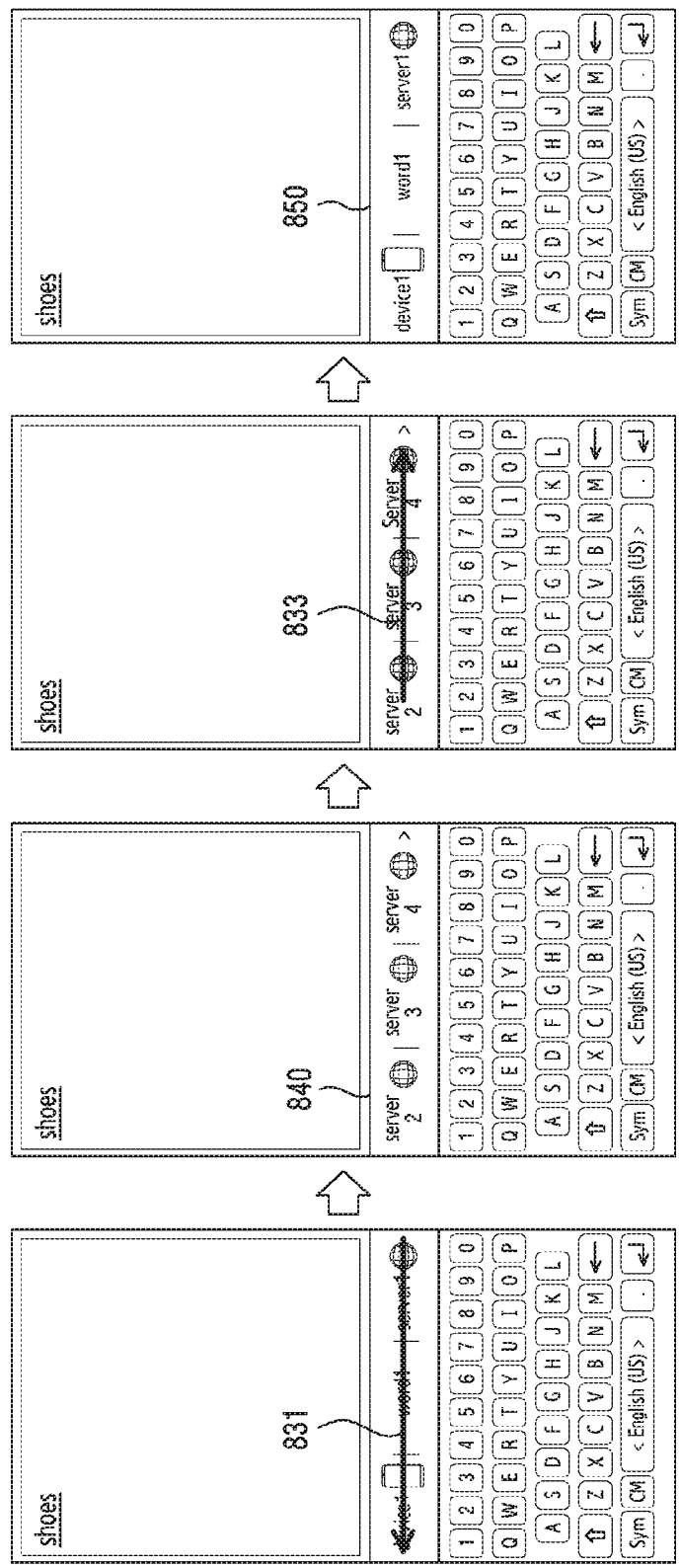
FIG. 8B is a diagram illustrating the configuration of a screen that displays another recommended piece of content in an electronic device according to various embodiments.
Figure 8C:
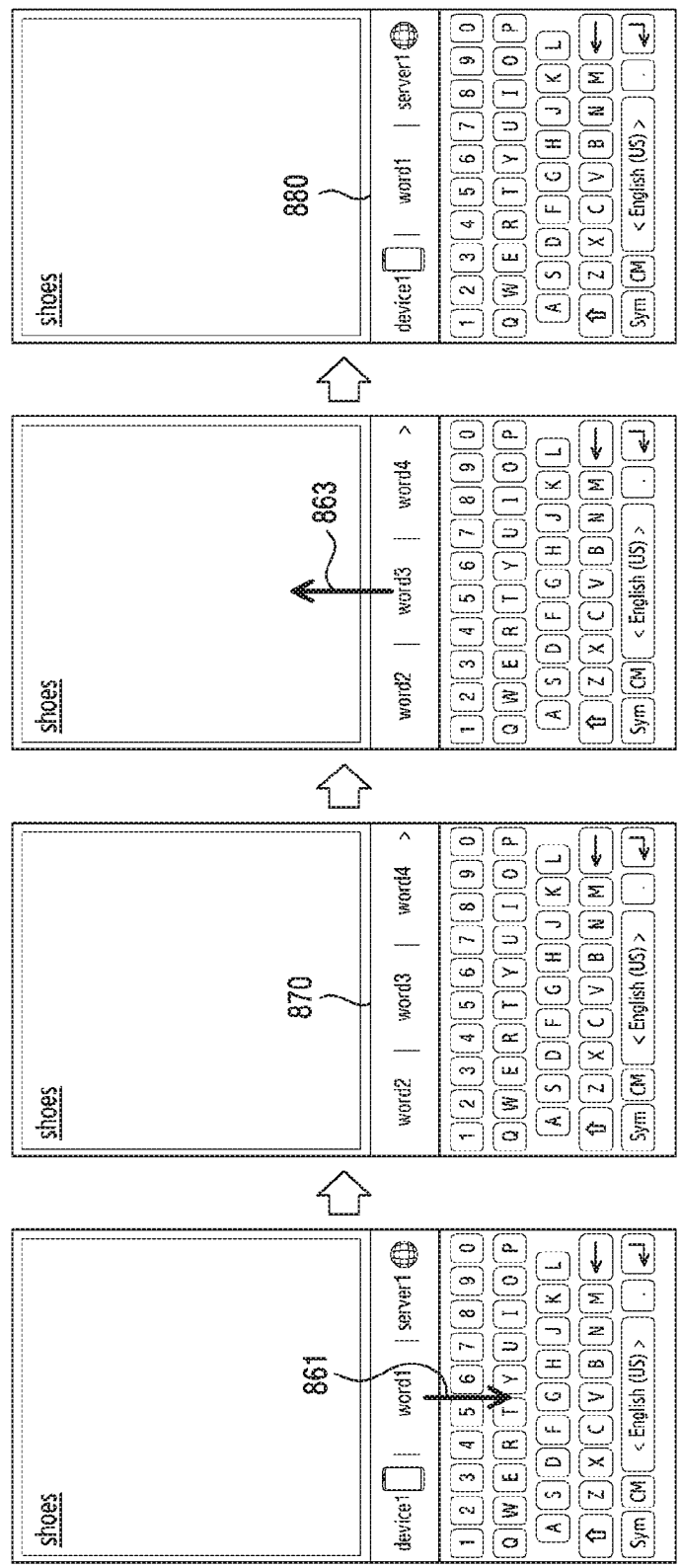
FIG. 8C is a diagram illustrating the configuration of a screen that displays another recommended piece of content in an electronic device according to various embodiments.

According to various embodiments, the electronic device (e.g., the processor 120) may display a recommended piece of content of the determined category in the content recommendation area in operation 705. For example, in response to detection of the first input, the processor 120 may perform control so that at least one other piece of recommended content corresponding to the determined category is displayed in the content recommendation area. For example, as illustrated in FIG. 8A, if drag input 801, performed in the direction from the left to the right in the content recommendation area, is detected in the state in which a word, "shoes", is input, the processor 120 may control the display (e.g., the display device 160 of FIG. 1) so as to display a plurality of other recommended pieces of content, "device 2, device 3, and device 4" 810, which belong to the same category as the content, "device 1", displayed in the left portion of the content recommendation area, in the content recommendation area. As another example, as illustrated in FIG. 8B, if drag input 831, performed in the direction from the right to the left in the content recommendation area, is detected in the state in which a word, "shoes", is input, the processor 120 may control the display so as to display a plurality of other recommended pieces of content "server 2, server 3, and server 4" 840, which belong to the same category as the piece of content, "server 1", displayed in the right portion of the content recommendation area, in the content recommendation area. As another example, as illustrated in FIG. 8C, if drag input 861, performed in the direction from the upper portion to the lower portion of the content recommendation area, is detected in the state in which the word "shoes" is input, the processor 120 may control the display so as to display a plurality of other recommended pieces of content "word 2, word 3, and word 4" 870, which belong to the same category as the piece of content, "word 1", displayed in the middle of the content recommendation area, in the content recommendation area.

According to various embodiments, the electronic device (e.g., the processor 120) may determine whether fourth input is detected in operation 707. According to an embodiment, the processor 120 may determine whether the fourth input performed on the first area is detected. The fourth input may include at least one of a drag, a double touch, a long touch, or a pressure touch.

According to an embodiment, the fourth input may be drag input performed in the direction opposite the drag direction of the first input. According to various embodiments, if the fourth input is detected, the electronic device (e.g., the processor 120) may restore the display state of a partial area including the content recommendation area to a previous display state in operation 709. According to an embodiment, in response to detection of the fourth input, the processor 120 may restore (or change) the display state of the content recommendation area to the display state that the content recommendation area had before the first input was detected. The content displayed in the content recommendation area via display state restoration, may be the same as the content that was displayed in the content recommendation area before detection of the first input. For example, as illustrated in FIG. 8A, if drag input 805, performed in the direction from the right to the left, is detected in the state in which a plurality of other recommended pieces of content 810 included in a predetermined category is displayed in the content recommendation area, the processor 120 may restore the display state of the content recommendation area 820 to the display state that the content recommendation area 820 had before the drag input 801 was detected. As another example, as illustrated in FIG. 8B, if drag input 833, performed in the direction from the left to the right, is detected in the state in which a plurality of other recommended pieces of content 840 included in a predetermined category is displayed in the content recommendation area, the processor 120 may restore the display state of a content recommendation area 850 to the display state that the content recommendation area 850 had before previous drag input 831 was detected. As another example, as illustrated in FIG. 8C, if drag input 863, performed in the direction from the bottom to the top, is detected in the state in which a plurality of other recommended pieces of content 870 included in a predetermined category is displayed in the content recommendation area, the processor 120 may restore the display state of a content recommendation area 880 to the display state that the content recommendation area 880 had before previous drag input 861 was detected. The content displayed in the content recommendation areas 820, 850, and 880 of the fourth screen configurations of FIGS. 8A, 8B, and 8C may be the same content as the content displayed in the content recommendation areas of the first screen configurations of FIGS. 8A, 8B, and 8C, respectively.

According to various embodiments, when the first input is not detected, the electronic device (e.g., the processor 120) may determine whether second input is detected in operation 711. According to an embodiment, the processor 120 may determine whether the second input performed on a second area is detected in the state in which recommended content related to at least one input word is displayed in the content recommendation area. The second area may include an area in which a first symbol (e.g., an extension icon) related to the extension of the content recommendation area is displayed, or a designated area. The second user input may include at least one of a touch, a double touch, a long touch, or a pressure touch.

According to various embodiments, if the second input is detected, the electronic device (e.g., the processor 120) may determine a category to be additionally displayed, based on the recommended content displayed in the content recommendation area, in operation 713. According to an embodiment, the processor 120 may identify the category of the at least one recommended piece of content displayed in the content recommendation area, and may determine the identified category to be the category to be additionally displayed. For example, if the second input is detected in the state in which two recommended words and one piece of advertising content are displayed in the content recommendation area, the processor 120 may determine a text category and an advertising category to be the categories to be additionally displayed. As another example, if the second input is detected in the state in which only three recommended words are displayed in the content recommendation area, the processor 120 may determine a text category to be the category to be additionally displayed.

Figure 9A:
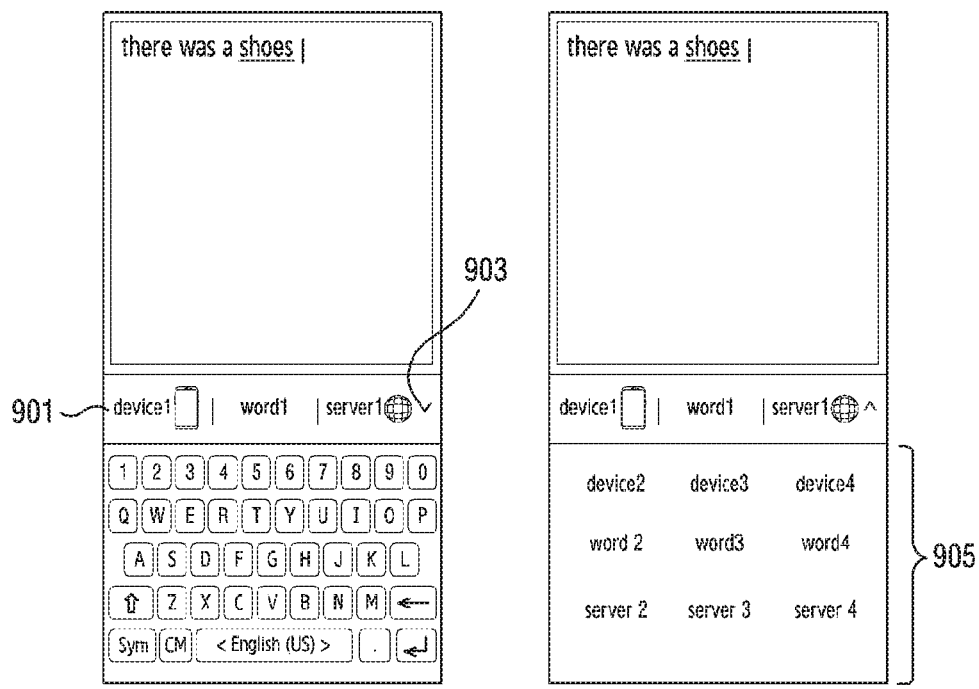
FIG. 9A is a diagram illustrating the configuration of a screen that displays another recommended piece of content in an electronic device according to various embodiments.
Figure 9B:
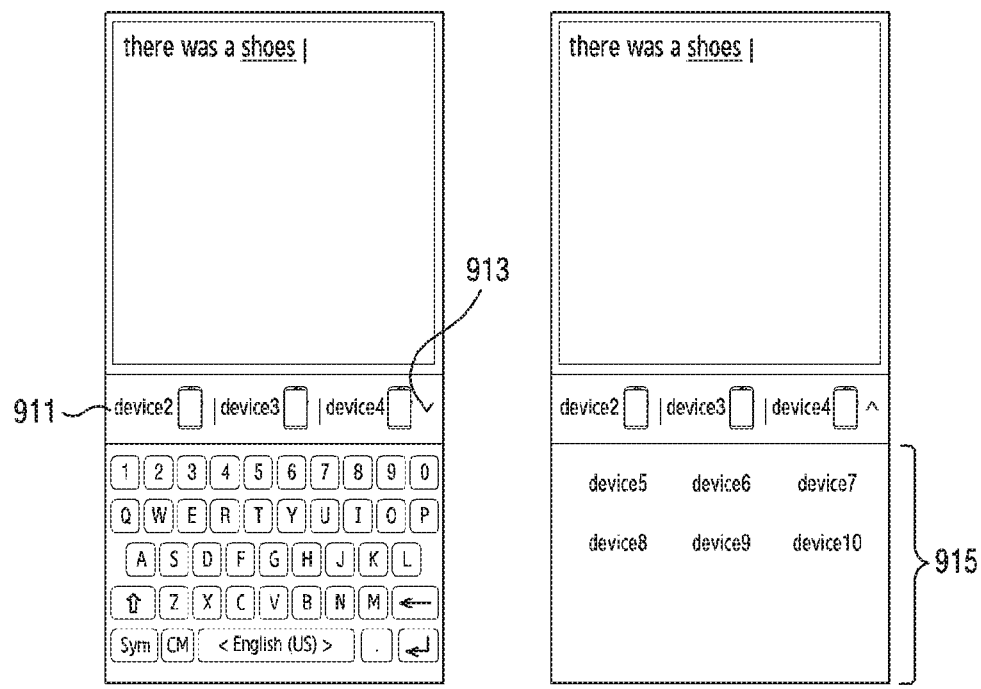
FIG. 9B is a diagram illustrating the configuration of a screen that displays another recommended piece of content in an electronic device according to various embodiments.
Figure 9C:
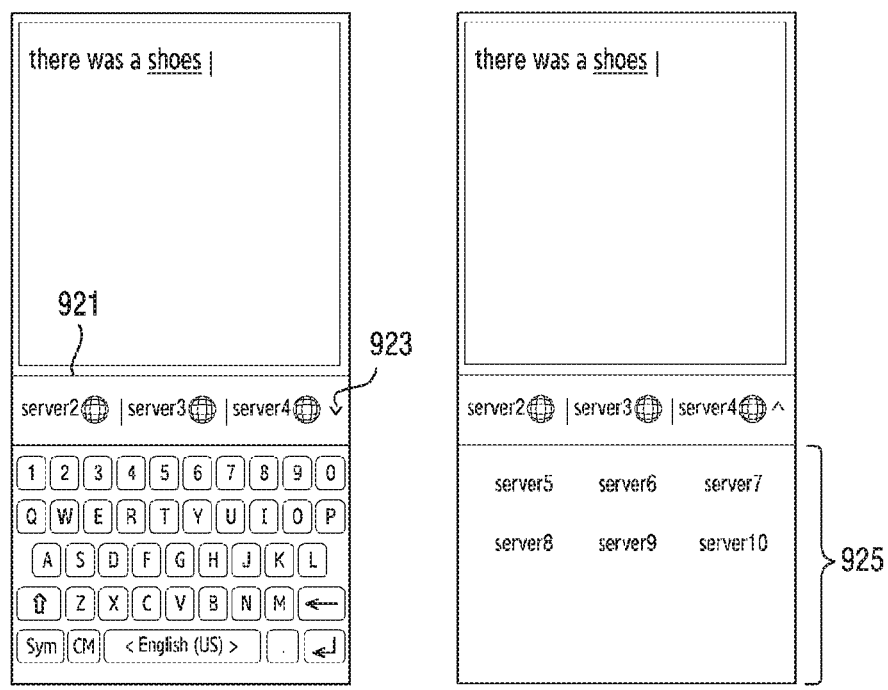
FIG. 9C is a diagram illustrating the configuration of a screen that displays another recommended piece of content in an electronic device according to various embodiments.
Figure 9D:
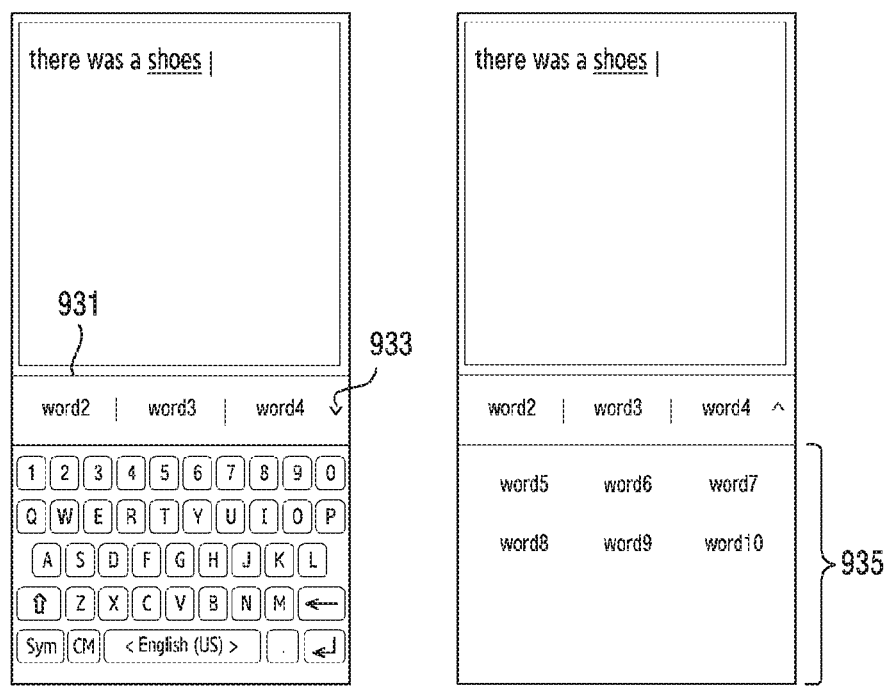
FIG. 9D is a diagram illustrating the configuration of a screen that displays another recommended piece of content in an electronic device according to various embodiments.

According to various embodiments, the electronic device (e.g., the processor 120) may additionally display another recommended piece of content of the determined category in an extended area of the content recommendation area in operation 715. According to an embodiment, the processor 12( )may extend the content recommendation area, and may control the display so as to display at least one other piece of recommended content corresponding to the category determined to be additionally displayed, in the extended area. According to an embodiment, the content recommendation area may be extended to include at least a part of an area in which the virtual keyboard is displayed. For example, the extended area may be an area including at least a part of the area in which the virtual keyboard is displayed. For example, if touch input performed on an extension icon 903, 913, 923, and 933 displayed in a content recommendation area 901, 911, 921, and 931 is detected, as illustrated in FIGS. 9A to 9D, the processor 120 may extend the content recommendation area 901, 911, 923, and 933, and may display a plurality of pieces of content that belong to the same category as the content included in the content recommendation area 901, 911, 921, and 931, in the extended area 905, 915, 925, and 935. For example, as illustrated in FIG. 9A, if touch input performed on the extension icon 903 is detected in the state in which a piece of content of a device category, "device 1", a piece of content of a text category, "word 1", and a piece of content of a server category, "server 1", are displayed in the content recommendation area 901, the processor 120 may perform control so as to display a plurality of pieces of content corresponding to the device category, "device 2, device 3, and device 4", a plurality of pieces of content corresponding to the text category, "word 2, word 3, and word 4", and a plurality of pieces of content corresponding to the server category, "server 2, server 3, and server 4", in the extended area 905 of the content recommendation area 901. As another example, as illustrated in FIG. 9B, if touch input performed on the extension icon 913 is detected in the state in which the content of the device category, "device 2, device 3, and device 4", is displayed in the content recommendation area 911, the processor 120 may perform control so as to display a plurality of pieces of content corresponding to the device category, "device 5, device 6, device 7, device 8, device 9, and device 10", in the extended area 915 of the content recommendation area 911. As another example, as illustrated in FIG. 9C, if touch input performed on the extension icon 923 is detected in the state in which the content of the server category, "server 2, server 3, and server 4", is displayed in the content recommendation area 921, the processor 120 may perform control so as to display a plurality of pieces of content corresponding to the server category, "server 5, server 6, server 7, server 8, server 9, and server 10", in the extended area 925 of the content recommendation area 921. As another example, as illustrated in FIG. 9D, if touch input performed on the extension icon 933 is detected in the state in which the content of the text category, "word 2, word 3, and word 4", is displayed in the content recommendation area 931, the processor 120 may perform control so as to display a plurality of pieces of content corresponding to the text category, "word 5, word 6, word 7, word 8, word 9, and word 10", in the extended area 935 of the content recommendation area 931.

According to various embodiments, the electronic device (e.g., the processor 120) may determine whether third input is detected in operation 717. According to an embodiment, in the state in which the content recommendation area is extended, the processor 120 may determine whether the third user input performed on the second area is detected. The third user input may include at least one of a touch, a double touch, a long touch, or a pressure touch.

According to various embodiments, if the third input is detected, the electronic device (e.g., the processor 120) may restore the display state of a partial area including the content recommendation area to a previous display state in operation 709. According to an embodiment, if the third input is detected, the processor 120 may control the display so as to reduce the extended content recommendation area to an original size. For example, if third user input performed on the second area is detected in the state in which the content recommendation area is extended, the processor 120 may control the display so as to stop the display of the extended area and to display only the content recommendation area before extension.

Figure 10A:
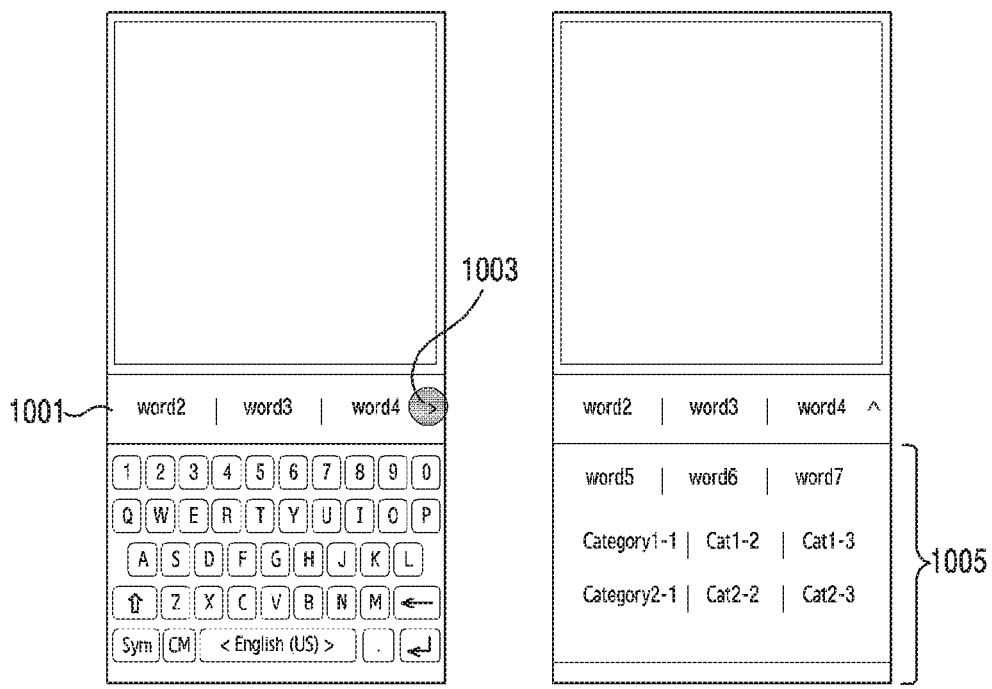
FIG. 10A is a diagram illustrating the configuration of a screen that displays another recommended piece of content in an electronic device according to various embodiments.
Figure 10B:
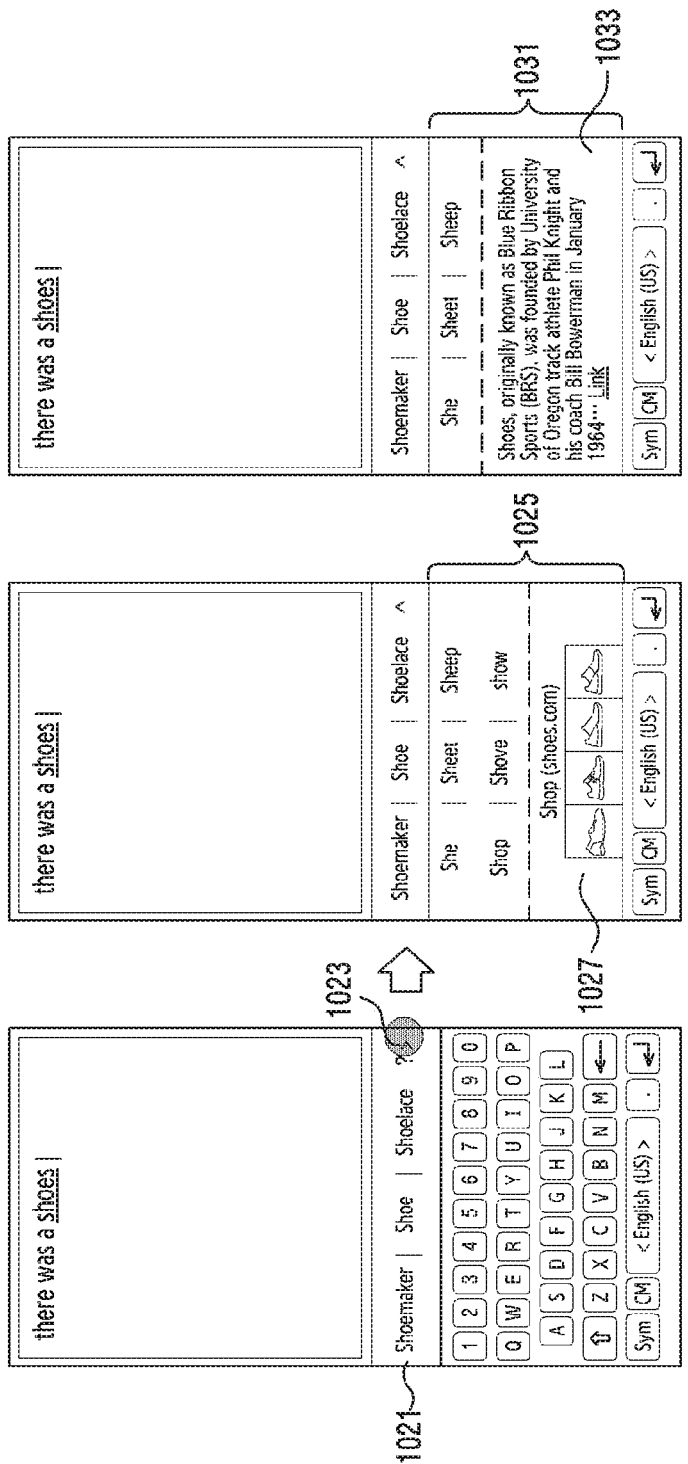
FIG. 10B is a diagram illustrating the configuration of a screen that displays another recommended piece of content in an electronic device according to various embodiments.

In the above-mentioned description, an example has been described in which only content that belongs to the same category as the content displayed in the content recommendation area is displayed in the extended area when the second input performed on the second area is detected. However, according to various embodiments, if the second input performed on the second area is detected, the electronic device 101 may display content belonging to the same category as the content displayed in the content recommendation area, and at least one piece of content belonging to another category, in the extended area. For example, as illustrated in FIG. 10A, if touch input performed on an extension icon 1003 is detected in the state in which content of a text category, "word 2, word 3, and word 4", is displayed in a content recommendation area 1001, the processor 120 may display a plurality of pieces of content corresponding to the text category, "word 5, word 6, and word 7", and may display a plurality of pieces of content corresponding to another category, "category1-1, category1-2, category1-3, category2-1, category2-1, and category3-1", in an extended area 1005 of the content recommendation area 1001. Particularly, as illustrated in FIG. 10B, if touch input on an extension icon 1023 is detected in the state in which content of a text category, "shoemaker, shoe, and shoelace", is displayed in a content recommendation area 1021, the processor 120 may display at least one of a plurality of pieces of content corresponding to the text category, "she, sheet, sheep, shop, shove, and show", and may display a piece of content 1027 and 1033 corresponding to an advertising category in an extended area 1025 and 1031 of the content recommendation area 1001.

Figure 11:
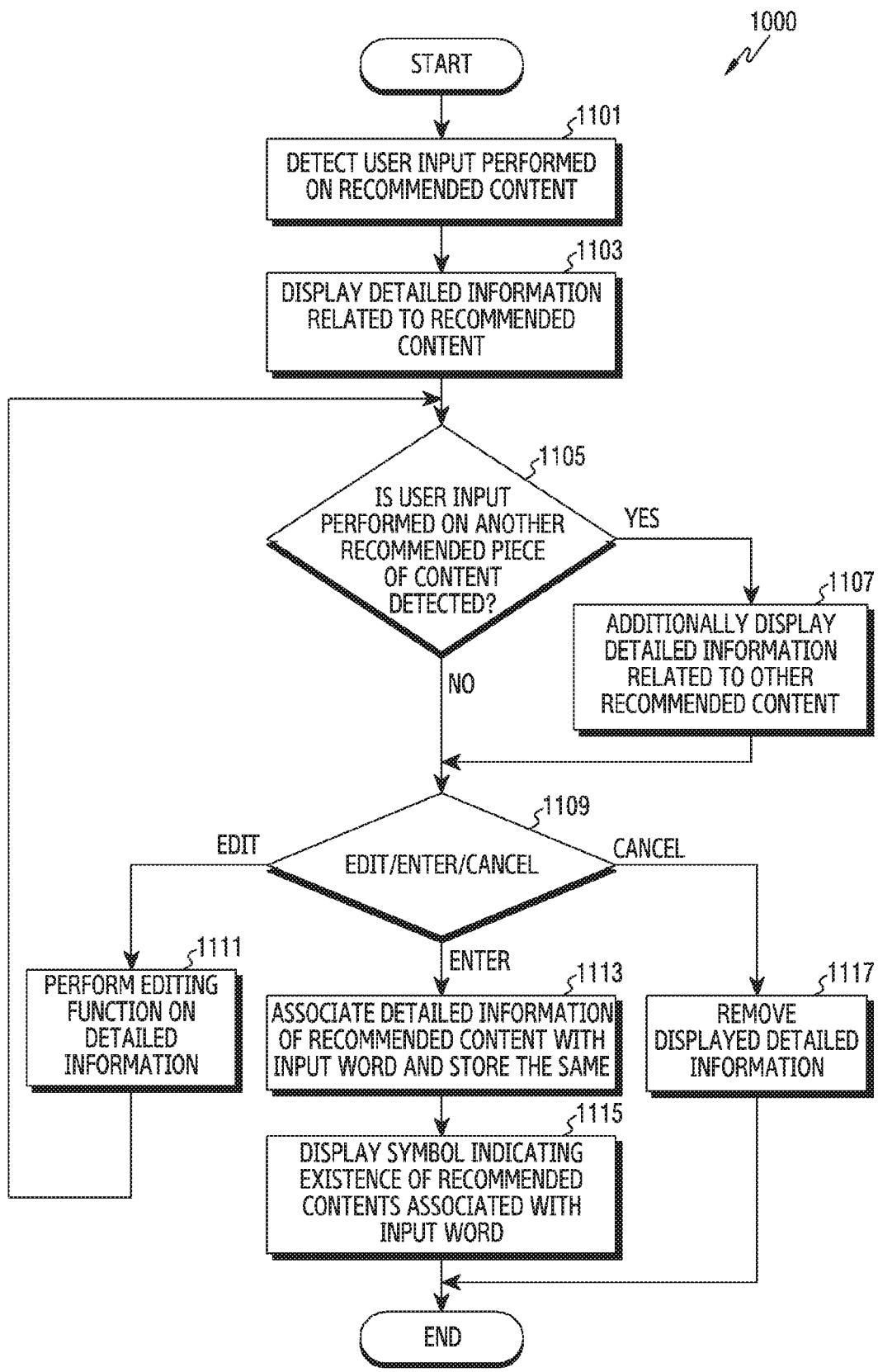
FIG. 11 is a flowchart illustrating a process in which an electronic device associates a recommended piece of content with an input word and stores the same according to various embodiments.
Figure 12A:
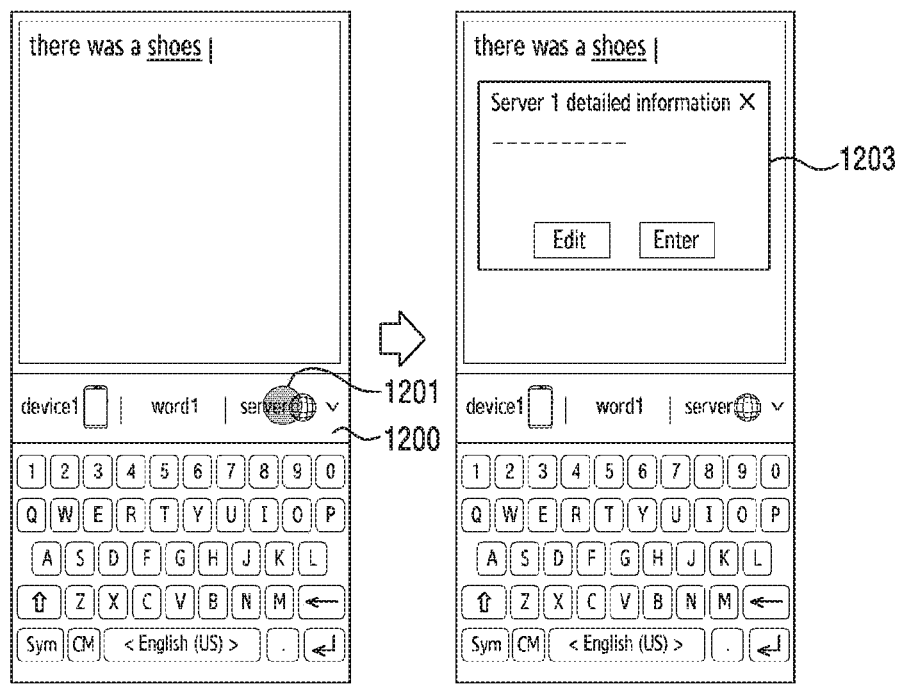
FIG. 12A is diagram illustrating the configuration of a screen that displays detailed information of a selected recommended content in an electronic device according to various embodiments.
Figure 12B:
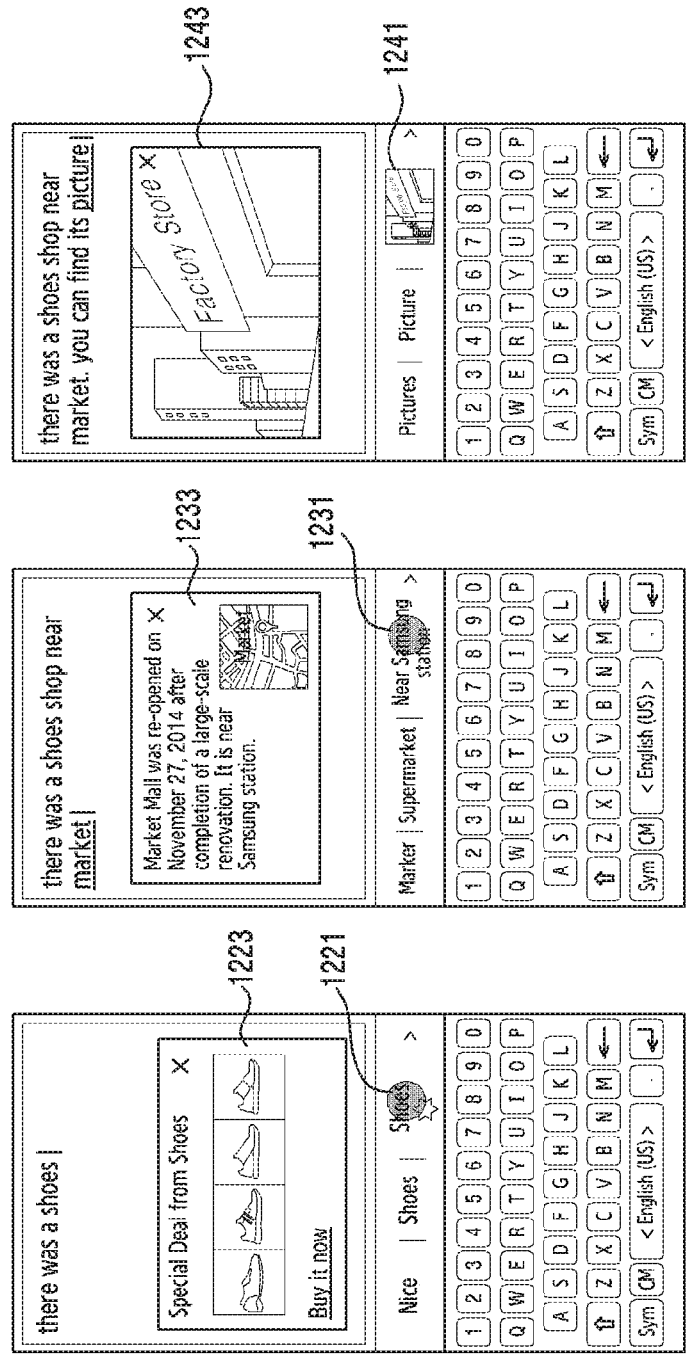
FIG. 12B is a diagram illustrating the configuration of a screen that displays detailed information of a selected recommended content in an electronic device according to various embodiments.
Figure 13:
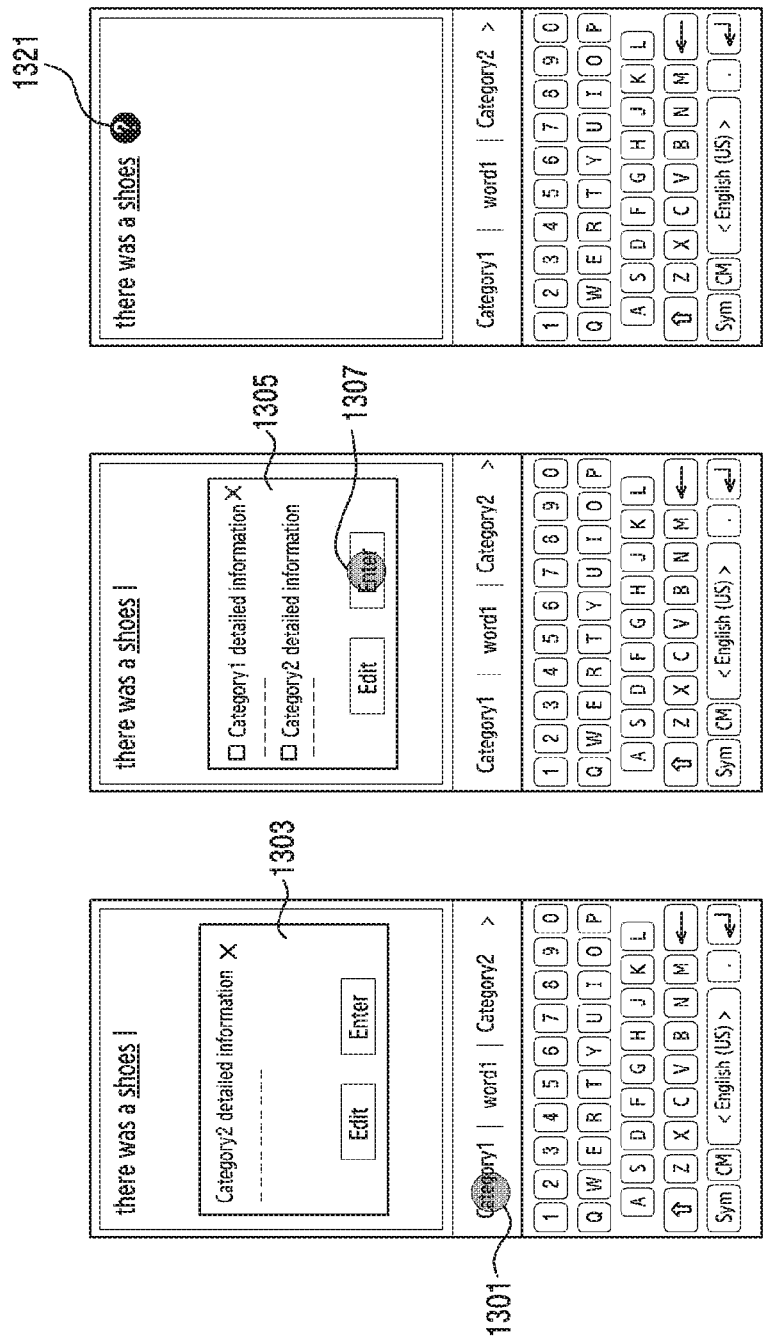
FIG. 13 is a diagram illustrating the configuration of a screen that displays detailed information of a plurality of recommended pieces of content in an electronic device according to various embodiments.
Figure 14:
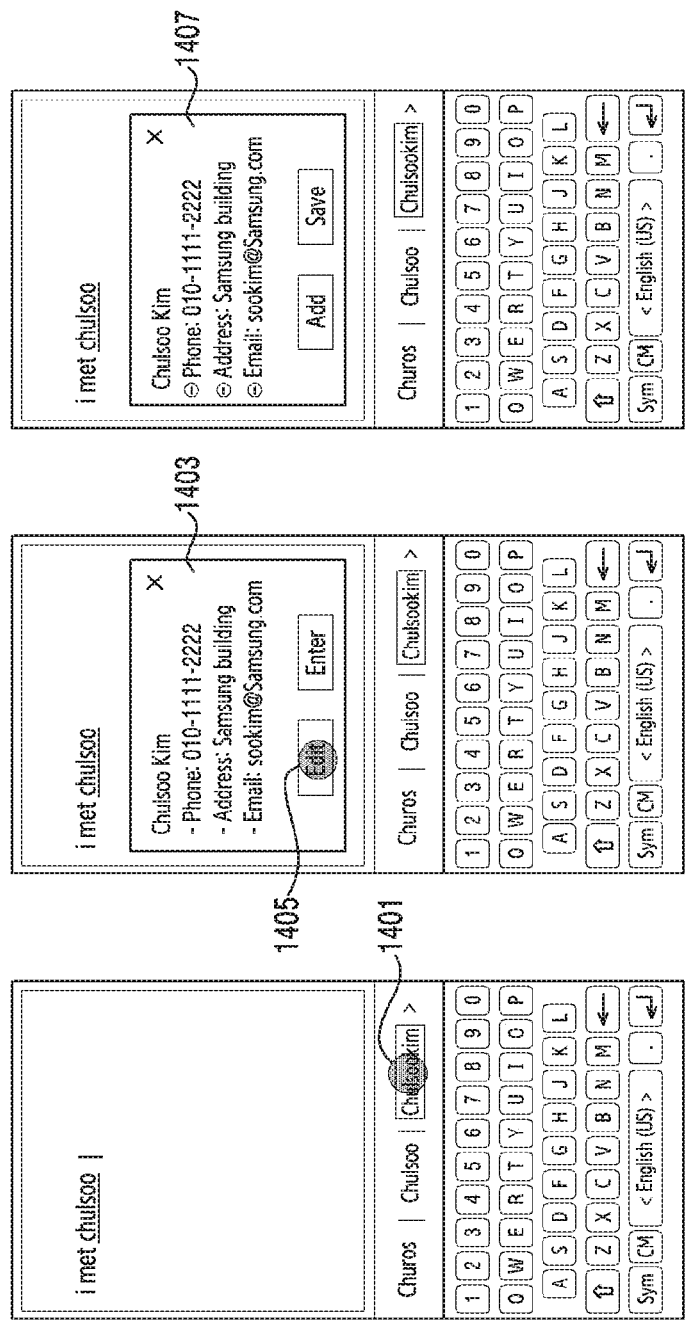
FIG. 14 is a diagram illustrating the configuration of a screen for editing detailed information of a recommended piece of content in an electronic device according to various embodiments.
Figure 15:
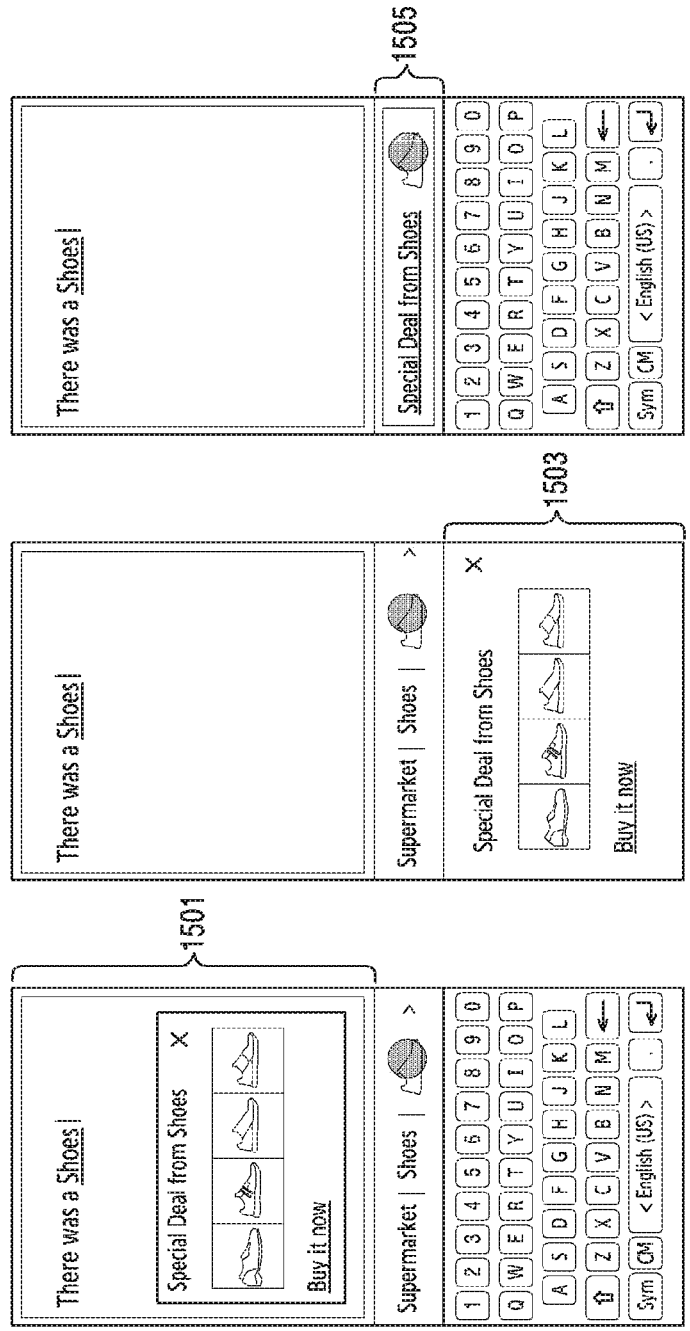
FIG. 15 is a diagram illustrating the configuration of a screen that includes a display area for a recommended piece of content in an electronic device according to various embodiments.

FIG. 11 is a flowchart illustrating a process in which an electronic device associates a recommended piece of content with an input word and stores the same according to various embodiments. In the embodiment provided hereinafter, operations may be performed sequentially, but are not necessarily limited thereto. For example, the order of operations may be changed, or at least two operations may be performed in parallel. Here, the electronic device of FIG. 11 may be the electronic device 101 of FIG. 1. According to an embodiment, the operations in FIG. 11 may be performed after the operations of FIG. 2 are performed, or after at least sonic operations of FIG. 7 are performed. Hereinafter, at least some operations of the electronic device (e.g., the processor 120) will be described with reference to FIGS. 12 to 15. FIGS. 12A and 12B are diagrams illustrating the configuration of a screen that displays detailed information of selected recommended content in an electronic device according to various embodiments. FIG. 13 is a diagram illustrating the configuration of a screen that displays detailed information of a plurality of recommended pieces of content in an electronic device according to various embodiments. FIG. 14 is a diagram illustrating the configuration of a screen for editing detailed information of a recommended piece of content in an electronic device according to various embodiments. FIG. 15 is a diagram illustrating the configuration of a screen that includes a display area for a recommended piece of content in an electronic device according to various embodiments.

Referring to FIG. 11, an electronic device (e.g., the processor 120 of FIG. 1) according to various embodiments may detect user input performed on a recommended piece of content in operation 1101. According to an embodiment, the processor 120 may detect user input performed to select at least one recommended piece of content displayed in a content recommendation area in the state in which recommended content related to at least one input word. is displayed in the content recommendation area.

According to various embodiments, the electronic device (e.g., the processor 120) may display detailed information related to the recommended content in operation 1103. According to an embodiment, the processor 120 may display a first popup window including the detailed information related to the at least one recommended piece of content selected by the user input. The detailed information may include at least one of an image, text, location information, a uniform resource identifier (URI), or a symbol related to a recommended piece of content. The above-mentioned information is merely an example, and the various embodiments of the disclosure are not limited thereto. The first popup window may include at least one of an edit symbol (or an edit button) for editing the detailed information of at least one recommended piece of content, an enter symbol (or an enter button) for associating the detailed information of a recommended piece of content with at least one input word, or a cancel symbol (or a cancel button) for stopping display of the first popup window. For example, as illustrated in FIG. 12A, if user input 1201 performed on "server 1" is detected in the state in which recommended content, "device 1, word 1, and server 1", associated with an input word, "shoes", is displayed in a content recommendation area 1200, the processor 120 may control a display (e.g., the display device 160 of FIG. 1) so as to display a first popup window 1203 including detailed information related to "server 1". Particularly, as illustrated in the first screen configuration of FIG. 12B, if user input 1221 performed on advertising content is detected in the state in which recommended content associated with an input word "shoes" is displayed in the content recommendation area, the processor 120 may control the display so as to display a first popup window 1223 including an advertising product image and a URL for purchasing the advertised product. As another example, as illustrated in the second screen configuration of FIG. 12B, if user input 1231 performed on location content is detected in the state in which recommended content associated with an input word, "market", is displayed in the content recommendation area, the processor 120 may control the display so as to display a first popup window 1233 including a map showing a location and a description associated with the location. As another example, as illustrated in the third screen configuration of FIG. 12B, if user input 1241 performed on image content is detected in the state in which recommended content associated with an input word, "picture", is displayed in the content recommendation area, the processor 120 may control the display so as to display a first popup window 1243 including an image.

According to various embodiments, the electronic device (e.g., the processor 120) may determine whether user input performed on at least one other piece of recommended content is detected in operation 1105. According to an embodiment, in the state in which the first popup window including the detailed information related to the at least one recommended piece of content is displayed, the processor 120 may determine whether user input performed to select at least one other piece of recommended content displayed in the content recommendation area is detected.

According to various embodiments, the electronic device (e.g., the processor 120) may additionally display detailed information related to the selected other recommended content in operation 1107. According to an embodiment, the processor 120 may additionally display detailed information related to the selected other recommended content in the first popup window displayed in operation 1103. For example, as illustrated in FIG. 13, if user input 1301 performed to select "category " is detected in the state in which a first popup window 1303 including detailed information related to "category2" is displayed, the processor 120 may display a first popup window 1305 including detailed information related to "category2" and detailed information related to "category1".

According to various embodiments, the electronic device (e.g., the processor 120) may detect whether at least one event among an edit event, an enter event, and a cancel event is detected in association with the detailed information of the recommended content in operation 1109. According to an embodiment, the processor 120 may detect an edit event, an enter event, or a cancel event based on whether at least one of an edit symbol, an enter symbol, or a cancel symbol in the first popup window including the detailed information of the recommended content is selected.

According to various embodiments, if an edit event is detected, the electronic device (e.g., the processor 120) may perform an editing function on the detailed information in operation 1111. According to an embodiment, if user input performed on the edit symbol included in the popup window is detected, the processor 120 may provide a user interface capable of editing (e.g., deleting, adding, or changing) the detailed information of at least one piece of content. For example, as illustrated in FIG. 14, if user input 1401 performed to select contact information content associated with an input word, "chulsoo", is detected, the processor 120 may control the display so as to display a first popup window 1403 including contact information associated with "chulsoo kim" in response thereto. If user input 1405 performed to select an edit symbol included in the first popup window 1403 is detected, the processor 120 may control the display so as to display a popup window 1407 which is editable. The editable popup window 1407 may be configured to enable deletion of at least one item displayed in the popup window, to add at least one other piece of information to the popup window, or to store an edited popup window. According to an embodiment, if completion of editing of the detailed information of at least one piece of content is detected, the processor 120 may display the first popup window including the detailed information on which editing is completed, and may return to operation 1105 and proceed with subsequent operations again.

According to various embodiments, if an enter event is detected, the electronic device (e.g., the processor 120) may associate the detailed information of the recommended content with the input word, and may store the same in operation 1113. According to an embodiment, if user input performed on the enter symbol included in the first popup window is detected, the processor 120 may associate the detailed information of at least one recommended piece of content with at least one input word, may store the same, and may stop the display of the first popup window.

According to various embodiments, the electronic device (e.g., the processor 120) may display a symbol indicating that the recommended content associated with the input word is present in operation 1115. According to an embodiment, the processor 120 may display a second symbol, indicating that associated recommended content is present, in an area in which at least one input word is displayed or in an area surrounding the area in which the at least one input word is displayed. For example, as illustrated in FIG. 13, if user input 1307 performed to select an enter symbol, "enter", is detected in the state in which the first popup window 1305 including the detailed information related to "category2" and the detailed information related to "category1" is displayed, the processor 120 may associate the input word, "shoes", with the detailed information related to "category2" and the detailed information related to "category1", may store the same, and may display a second symbol 1321 indicating that a recommended piece of content related to "shoes" is present.

According to various embodiments, if a cancel event is detected, the electronic device (e.g., the processor 120) may remove the displayed detailed information in operation 1117. According to an embodiment, if user input performed on a cancel symbol included in the first popup window is detected, the processor 120 may stop the display of the first popup window.

Although the above description has been provided with reference to the example in which a first popup window is displayed in an area in which an input character is displayed, the first popup window may be displayed in at least some of a virtual keyboard area or a content recommendation area. For example, as illustrated in FIG. 15, a first popup window including detailed information related to a selected recommended content may be displayed in an area 1501 where an input character is displayed, a virtual keyboard area 1503, or a content recommendation area 1505.

Although the above description has been provided with reference to an example in which, if user input performed to select a recommended piece of content is detected, a first popup window including detailed information associated with the selected recommended content is displayed, the first popup window may not be displayed if the selected recommended content is a piece of content belonging to a text category. For example, if the recommended content selected by the user input is a recommended word corresponding to a text category, the processor 120 may not display the first popup window, and may replace at least one input word related to the recommended content with the recommended word which is the selected recommended content.

Figure 16:
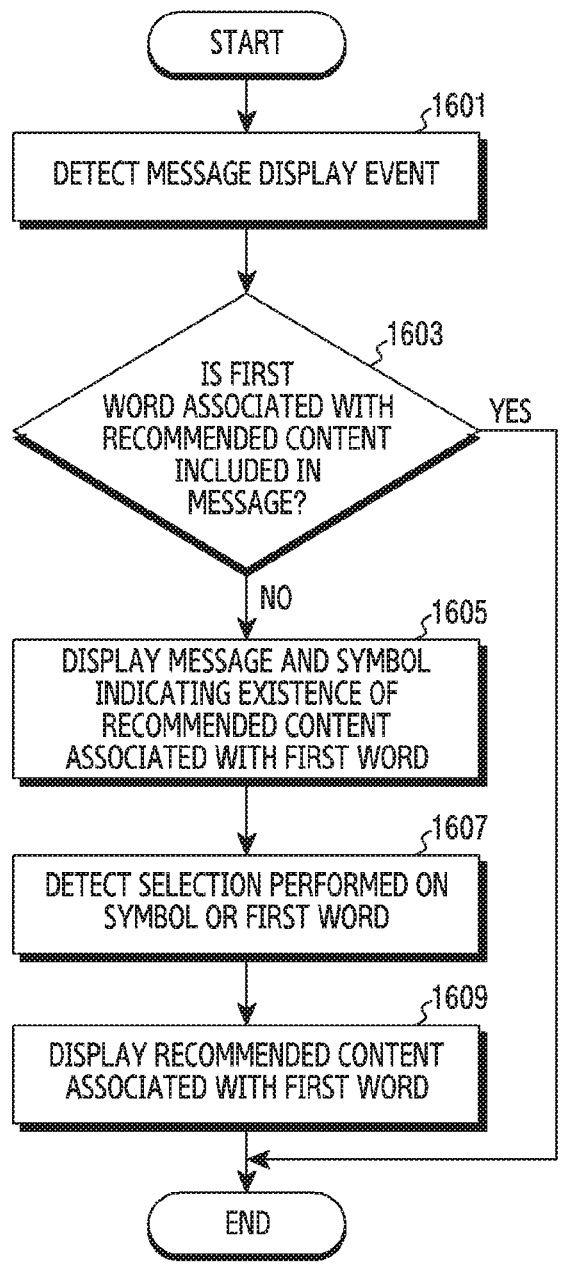
FIG. 16 is a flowchart illustrating a process in which an electronic device displays a recommended piece of content associated with a selected word according to various embodiments.
Figure 17:
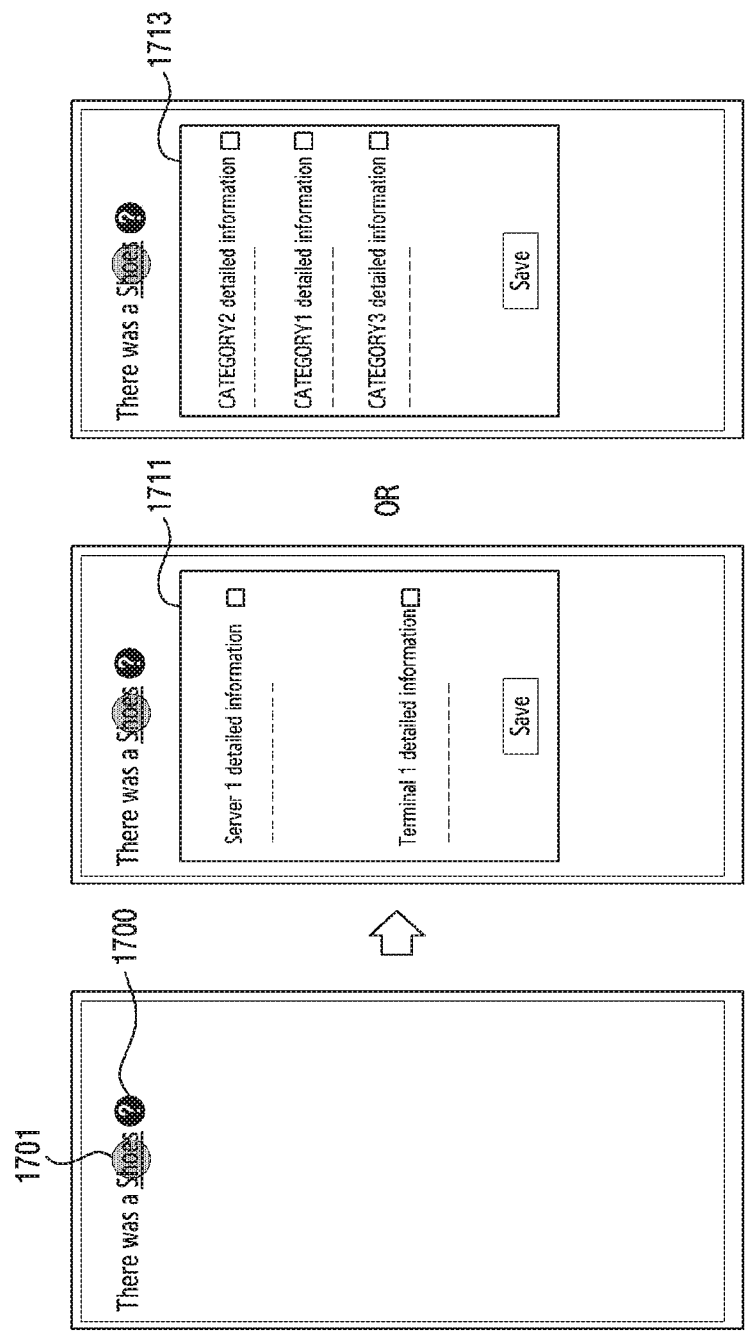
FIG. 17 is a diagram illustrating the configuration of a screen that displays a recommended piece of content associated with a selected word in an electronic device according to various embodiments.
Figure 18:
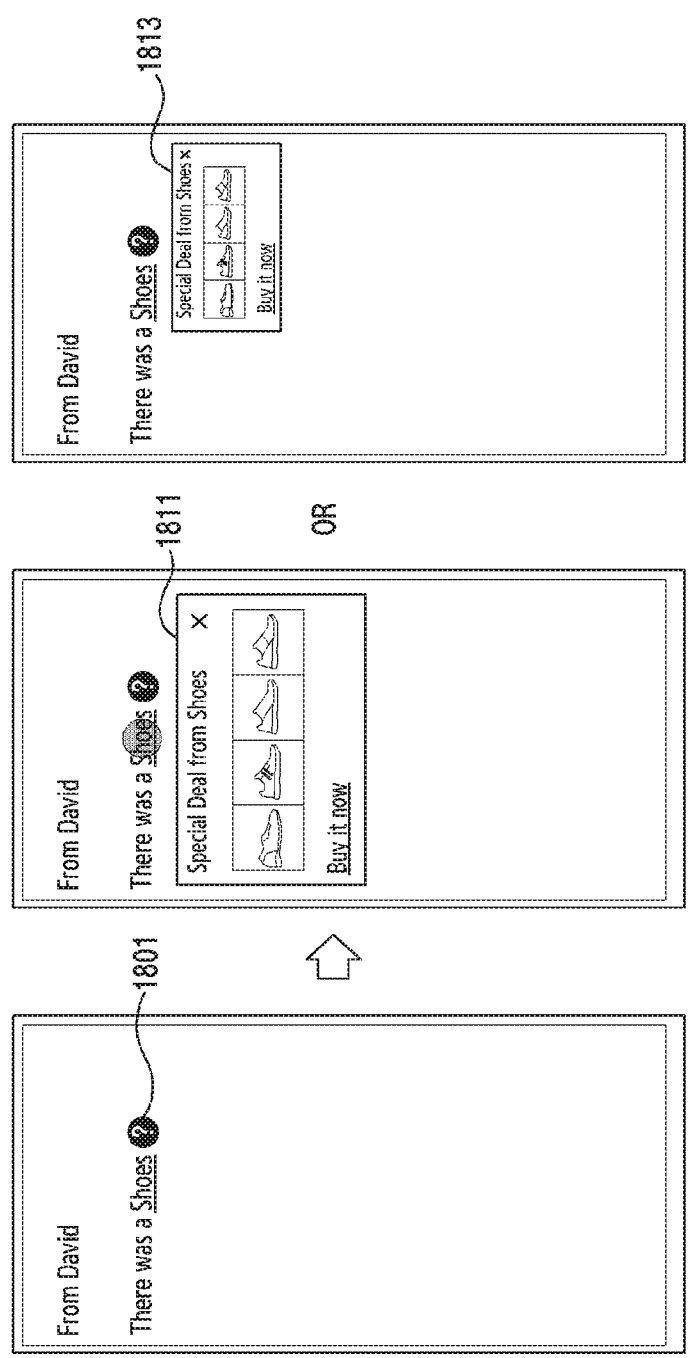
FIG. 18 is a diagram illustrating the configuration of a screen that displays a recommended piece of content associated with a selected word in an electronic device according to various embodiments.

FIG. 16 is a flowchart illustrating a process in which an electronic device displays a recommended piece of content associated with a selected word according to various embodiments. In the embodiment provided hereinafter, operations may be performed sequentially, but are not necessarily limited thereto. For example, the order of operations may be changed, or at least two operations may be performed in parallel. Here, the electronic device of FIG. 16 may be the electronic device 101 of FIG. 1. Hereinafter, at least some operations of the electronic device (e.g., the processor 120) will be described with reference to FIGS. 17 and 18. FIGS. 17 and 18 are diagrams illustrating the configuration of a screen that displays a recommended piece of content associated with a selected word in an electronic device according to various embodiments.

Referring to FIG. 16, an electronic device (e.g., the processor 120 of FIG. 1) according to various embodiments may detect a message display event in operation 1601. According to an embodiment, the message display event may be an event for displaying a message stored in a memory (e.g., the memory 130 of FIG. 1) of the electronic device. The message stored in the memory 130 may include a message (or a memo) written and/or stored by a memo application, a schedule management application, or a message application. According to an embodiment, the message display event may be an event for displaying a message received from another electronic device.

According to various embodiments, the electronic device (e.g., the processor 120) may determine whether a first word associated with a recommended piece of content is included in the message in operation 1603. For example, the processor 120 may determine whether the first word associated with the recommended content, such as advertising content, image content, contact information content, or the like, is present among the words included in the message.

According to various embodiments, if the first word associated with the recommended content is included in the message, the electronic device (e.g., the processor 120) may display the message and a symbol, indicating that the recommended content associated with the first word is present, in operation 1605. The symbol indicating the existence of the recommended content associated with the first word may be displayed in an area in which the first word is displayed or in an area surrounding the area in which at least one first word is displayed. For example, as illustrated in FIG. 17, the processor 120 may perform control so that the message "there was a shoes" and a symbol 1700 indicating the existence of a recommended piece of content associated with "shoes" are displayed on a display (e.g., the display device 160 of FIG. 1). This is merely an example, and the disclosure is not limited thereto. For example, the processor 120 may display the first word to be emphasized, instead of displaying the symbol indicating the existence of the recommended content associated with the first word. For example, the color, size, thickness, or font of the first word may be adjusted, or another visual effect may be applied to the first word so that the first word is visually distinguished from at least one other word that is not associated with the recommended content.

According to various embodiments, the electronic device (e.g., the processor 120) may detect selection performed on the symbol or the first word in operation 1607. For example, as illustrated in FIG. 17, the processor 120 may detect user input 1701 performed to select "shoes" in the message, "there was a shoes.". As another example, as illustrated in FIG. 18, the processor 120 may detect user input performed to select a symbol 1801 indicating the existence of a recommended piece of content associated with "shoes" in the state in which a received message, "From David, There was a shoes", is displayed.

According to various embodiments, the electronic device (e.g., the processor 120) may display the recommended content associated with the first word in operation 1609. According to an embodiment, the processor 120 may control the display so as to display a second popup window including detailed information associated with the at least one recommended piece of content associated with the first word. The second popup window may be displayed in an area adjacent to the first word. A display area and/or the size of the second popup window may be set and/or changed by a designer and/or a user. For example, as illustrated in FIG. 17, the processor 120 may display a second popup window 1711 and 1713 including the detailed information of the recommended content associated with the selected first word, "shoes", in response to detection of selection performed on the first word. As another example, as illustrated in FIG. 18, the processor 120 may display a second popup window 1811 and 1813 including the detailed information of advertising content associated with "shoes" in response to detection of selection performed on the symbol 1801 indicating the existence of the recommended content associated with "shoes".

According to various embodiments, an operation method of an electronic device (e.g., the electronic device 101 of FIG. 1) may include: an operation of detecting at least one input word; an operation of determining priorities of a plurality of categories associated with a piece of content based on the at least one input word; an operation of determining at least one recommended category based on the determined priorities of the plurality of categories; and an operation of displaying at least one piece of content corresponding to the at least one determined recommended category as at least one recommended piece of content for the at least one input word.

According to various embodiments, the at least one piece of content may include at least one of text, image content, advertising content, video content, music content, contact information content, or location-related content.

According to various embodiments, the method may further include: an operation of detecting input performed on the at least one recommended piece of content; and an operation of displaying detailed information associated with the at least one recommended piece of content in response to detection of the input.

According to various embodiments, the method may further include: an operation of detecting additional input in the state in which the detailed information associated with the at least one recommended piece of content is displayed; and an operation of associating the detailed information of the at least one recommended piece of content with the at least one input word and storing the same in response to the detection of the additional input.

According to various embodiments, the method may further include: an operation of detecting input performed on the at least one input word in the state in which the at least one input word associated with the detailed information of the at least one recommended piece of content is displayed; and an operation of displaying detailed information of the recommended content associated with the at least one word in response to the detection of the input performed on the at least one input word.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a display;
   at least one processor; and
   a memory operatively connected to the processor,
   wherein the memory stores instructions configured to, when executed, enable the at least one processor to:
   obtain at least one input word;
   based on the at least one input word, determine at least one recommended word,
   determine an accuracy of the at least one recommended word;
   based on the determined accuracy, determine a number of the at least one recommended word;
   identify a number of default recommended categories;
   based on the number of the at least one recommended word and the number of the default recommended categories, determine a number of at least one recommended category;
   determine priorities of a plurality of categories based on the at least one input word, wherein the plurality of categories indicate at least one of a type of content or sources from which content is obtained, the content corresponding to the at least one input word;
   determine the at least one recommended category based on the determined priorities of the plurality of categories and the number of the at least one recommended category; and
   control the display so as to display at least one piece of content corresponding to the at least one determined recommended category as at least one recommended piece of content for the at least one input word.

2. The electronic device as claimed in claim 1, wherein the at least one piece of content comprises at least one of text, image content, advertising content, video content, music content, contact information content, or location-related content.

3. The electronic device as claimed in claim 1, wherein the instructions enable the processor to determine the priorities of the plurality of categories based additionally on at least one of a usage rate of each category, a preference for each category, an advertising cost, a predetermined context, or a number of pieces of content related to an input word among content included in each category.

4. The electronic device as claimed in claim 1, wherein the instructions enable the processor to:
   detect first input in a state in which the at least one recommended piece of content is displayed; and
   display at least one other piece of recommended content corresponding to the same category as a first recommended piece of content corresponding to an attribute of the first input among the at least one recommended piece of content, in response to detection of the first input.

5. The electronic device as claimed in claim 1, wherein the attribute of the first input comprises at least one of a drag direction, a number of touches, a touch time, or a touch location.

6. The electronic device as claimed in claim 1, wherein the instructions enable the processor to:
   detect second input in a state in which the at least one recommended piece of content is displayed; and
   additionally display at least one other piece of recommended content corresponding to the same category as the at least one recommended piece of content in response to detection of the second input.

7. The electronic device as claimed in claim 6, wherein the instructions enable the processor to:
   display the at least one recommended piece of content in a first area; and
   display the at least one other piece of recommended content in a second area,
   wherein the second area comprises at least a part of a virtual keyboard.

8. The electronic device as claimed in claim 1, wherein the instructions enable the processor to:
   detect third input performed on the at least one recommended piece of content; and
   display detailed information of the at least one recommended piece of content in response to detection of the third input.

9. The electronic device as claimed in claim 8, wherein the instructions enable the processor to:
   detect fourth input in a state in which the detailed information of the at least one recommended piece of content is displayed; and
   in response to detection of the fourth input, associate the at least one input word with the detailed information of the at least one recommended piece of content, store the same, and display a visual effect indicating that the at least one input word is associated with the at least one recommended piece of content.

10. The electronic device as claimed in claim 9, wherein the instructions enable the processor to:
    detect fifth input in a state in which the detailed information of the at least one recommended piece of content is displayed; and
    provide a user interface that is capable of editing the detailed information of the at least one recommended piece of content in response to detection of the fifth input.

11. The electronic device as claimed in claim 9, wherein the instructions enable the processor to:
    detect user input performed on the at least one input word in a state in which a message including the at least one input word associated with the detailed information of the at least one recommended piece of content is displayed; and
    display the detailed information of the recommended content associated with the at least one word in response to detection of the user input.

12. An operation method of an electronic device, the method comprising:
    obtaining at least one input word;

based on the at least one input word, determining at least one recommended word;

determining an accuracy of the at least one recommended word;

based on the determined accuracy, determining a number of the at least one recommended word;

identifying a number of default recommended categories;

based on the number of the at least one recommended word and the number of the default recommended categories, determining a number of at least one recommended category;

determining priorities of a plurality of categories based on the at least one input word, wherein the plurality of categories indicate at least one of a type of content or sources from which content is obtained, the content corresponding to the at least one input word;

determining the at least one recommended category based on the determined priorities of the plurality of categories and the number of the at least one recommended category; and displaying at least one piece of content corresponding to the at least one determined recommended category as at least one recommended piece of content for the at least one input word.

13. The method of claim 12, wherein the at least one piece of content comprises at least one of text, image content, advertising content, video content, music content, contact information content, or location-related content, and wherein the method further comprises:

detecting input performed on the at least one recommended piece of content; and display detailed information associated with the at least one recommended piece of content in response to direction of the input.

14. An electronic device comprising:

a display;

at least one processor; and a memory operatively connected to the processor, wherein the memory comprises instructions configured to, when executed, enable the at least one processor to:

control the display so as to display a message including at least one word associated with at least one recommended piece of content and an indicator indicating that the at least one recommended piece of content associated with the at least one word exists;

detect user input performed on the at least one word;

control the display so as to display a recommended piece of content associated with the at least one word in response to detection of the user input;

detect input for the recommended piece of content; and in response to detecting the input, control the display to display a popup window including detailed information corresponding to the recommended piece of content, wherein the detailed information includes information on a plurality of categories indicating at least one of a type of content or sources from which content being obtained the recommended piece of content.

* * * * *